United States Patent [19]

Souder et al.

[11] Patent Number: 5,724,556
[45] Date of Patent: Mar. 3, 1998

[54] METHOD AND APPARATUS FOR DEFINING AND CONFIGURING MODULES OF DATA OBJECTS AND PROGRAMS IN A DISTRIBUTED COMPUTER SYSTEM

[75] Inventors: Benny Souder, Belmont; Lip Boon Doo, San Jose; Curtis Elsbernd, San Mateo; Peter Lim, Redwood City, all of Calif.

[73] Assignee: Oracle Corporation, Redwood Shores, Calif.

[21] Appl. No.: 422,042

[22] Filed: Apr. 14, 1995

[51] Int. Cl.$^6$ .................. G06F 3/00; G06F 7/00
[52] U.S. Cl. .................. 395/500; 395/614; 395/615; 395/335; 395/200.79; 395/684; 395/800.28; 395/703
[58] Field of Search .................. 395/500, 600, 395/650, 700, 800, 375, 200.1, 200.12, 200.02, 200.09, 200.03, 280, 826, 182.08, 200.13, 182.06, 468, 486, 444, 200.01, 612, 613, 683, 614, 611, 619, 618, 621, 701, 703, 705, 604, 601, 615; 364/578, 188, 131, 138; 370/60, 94.1

[56] References Cited

U.S. PATENT DOCUMENTS

| | | | |
|---|---|---|---|
| 4,455,619 | 6/1984 | Masui et al. | 395/509 |
| 4,558,413 | 12/1985 | Schmidt et al. | 395/619 |
| 4,734,854 | 3/1988 | Afshar | 395/703 |
| 4,809,170 | 2/1989 | Leblang et al. | 395/703 |
| 4,833,604 | 5/1989 | Cheng et al. | 395/616 |
| 4,866,638 | 9/1989 | Cosentino et al. | 395/335 |
| 4,888,690 | 12/1989 | Huber | 395/604 |
| 4,893,232 | 1/1990 | Shimaoka et al. | 395/601 |
| 4,894,771 | 1/1990 | Kunii et al. | 395/604 |
| 4,930,071 | 5/1990 | Tou et al. | 395/604 |
| 4,939,689 | 7/1990 | Davis et al. | 395/613 |
| 4,956,773 | 9/1990 | Saito et al. | 395/703 |
| 5,084,813 | 1/1992 | Ono | 395/703 |
| 5,097,412 | 3/1992 | Orimo et al. | 395/500 |
| 5,136,708 | 8/1992 | Lapourtre et al. | 395/673 |
| 5,187,787 | 2/1993 | Skeen et al. | 395/680 |
| 5,202,996 | 4/1993 | Sugino et al. | 395/701 |
| 5,261,094 | 11/1993 | Everson et al. | 395/617 |
| 5,265,250 | 11/1993 | Andrade et al. | 395/671 |
| 5,295,222 | 3/1994 | Wadhwa et al. | 395/703 |
| 5,307,484 | 4/1994 | Baker et al. | 395/615 |
| 5,329,626 | 7/1994 | Klein et al. | 395/200.78 |
| 5,335,339 | 8/1994 | Maejima et al. | 395/500 |
| 5,381,534 | 1/1995 | Shi | 395/706 |
| 5,381,548 | 1/1995 | Matsuo | 395/706 |
| 5,414,812 | 5/1995 | Filip et al. | 395/614 |
| 5,423,037 | 6/1995 | Hvasshovd | 395/618 |
| 5,440,719 | 8/1995 | Hanes et al. | 395/500 |
| 5,544,320 | 8/1996 | Konrad | 395/200.033 |
| 5,555,404 | 9/1996 | Torbjornsen et al. | 395/618 |
| 5,604,892 | 2/1997 | Nuttall et al. | 395/615 |

*Primary Examiner*—Jacques Louis-Jacques
*Attorney, Agent, or Firm*—Blakely, Sokoloff, Taylor & Zafman

[57] ABSTRACT

A distributed system modeler for modeling a distributed system architecture. The distributed system modeler includes logic for receiving interdependency information specifying interdependencies between a plurality of data objects and programs, logic for defining a plurality of modules, wherein each module of the plurality of modules represents a different grouping of a portion of the plurality of data objects and programs, logic for assigning the modules to nodes in a distributed system, and logic for assigning a distributed transfer methodology between modules in the distributed system. The distributed system modeler includes logic for generating impact analysis criteria defining a quality of said distributed system. The impact analysis criteria includes performance metrics, conflict metrics, data object or program availability metrics, and transaction consistency metrics. The distributed transfer methodology includes a distributed transaction methodology, a synchronous replication methodology, an asynchronous replication methodology, and a procedural replication methodology.

46 Claims, 19 Drawing Sheets

| Business Information Groups / Business Functions | Customer Data | Order Data | Shipment Data | Billing Data |
|---|---|---|---|---|
| Maintain Customer | CU | | | |
| Maintain Orders | R | CUD | | |
| Ship Orders | | RU | C | |
| Prepare Billing | R | | RU | C |

C-Create
R-Read
U-Update
D-Delete

FIG. 3

| Business Data Structures / Business Functions | Customer | Customer Address | Order Header | Order Line | Order Shipment | Invoice |
|---|---|---|---|---|---|---|
| Maintain Customer | CU | CU | | | | |
| Maintain Orders | R | | CUD | CUD | | |
| Ship Orders | | | R | RU | C | |
| Prepare Billing | | R | | | RU | C |

C-Create
R-Read
U-Update
D-Delete

FIG. 4

| Business Programs \ Business Data Structures | Customer | Customer Address | Order Header | Order Line | Order Shipment | Invoice |
|---|---|---|---|---|---|---|
| Enter_Customer | C | C | | | | |
| Maintain_Address | | CU | | | | |
| Enter_Order | R | | C | C | | |
| Change_Order | R | | UD | UD | | |
| Print_Pickup_Slip | | | R | U | | |
| Confirm_Shipment | | | | R | C | |
| Create_Invoice | | R | | | RU | C |

C-Create
R-Read
U-Update
D-Delete

FIG. 5

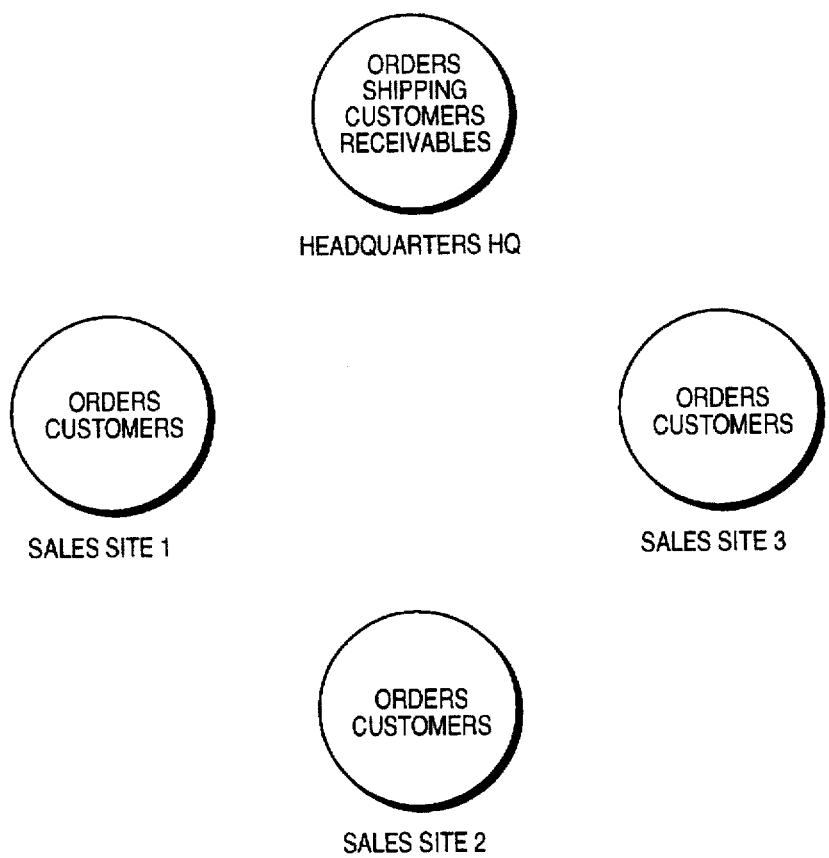

FIG. 22

| BUSINESS LOCATION | MODULE USAGE | MODULE LOCATIONS FOR FIRST SAMPLE ARCHITECTURE | MODULE LOCATIONS FOR SECOND SAMPLE ARCHITECTURE |
|---|---|---|---|
| HQ | ORDERS SHIPPING CUSTOMERS RECEIVABLES | ORDERS @ HQDB SHIPPING @ HQDB CUSTOMERS @ HQDB RECEIVABLES @ HQDB | ORDERS @ HQDB SHIPPING @ HQDB CUSTOMERS @ HQDB RECEIVABLES @ HQDB |
| SALES SITE 1 | ORDERS CUSTOMERS | ORDERS @ HQDB CUSTOMERS @ HQDB | ORDERS @ SALES 1 CUSTOMERS @ SALES 1 |
| SALES SITE 2 | ORDERS CUSTOMERS | ORDERS @ HQDB CUSTOMERS @ HQDB | ORDERS @ SALES 2 CUSTOMERS @ SALES 2 |
| SALES SITE 3 | ORDERS CUSTOMERS | ORDERS @ HQDB CUSTOMERS @ HQDB | ORDERS @ SALES 3 CUSTOMERS @ SALES 3 |

FIG. 23

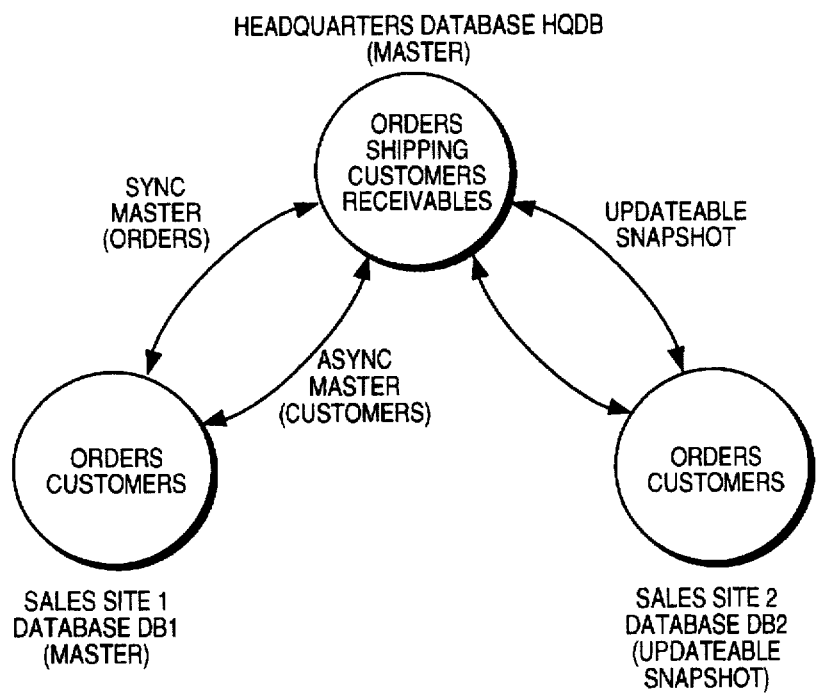

FIG. 24

| DATABASE | MODULE INSTALLATION | MODULE COMMUNICATIONS |
|---|---|---|
| HQDB | ORDERS | ORDERS @ DB1 SYNC PARENT = NO |
| | | ORDERS @ DB2 ASYNC PARENT = NO |
| | SHIPPING | NA |
| | CUSTOMERS | CUSTOMERS @ DB1 ASYNC PARENT = YES |
| | | CUSTOMERS @ DB2 ASYNC PARENT = NO |
| | RECEIVABLES | NA |
| DB1 | ORDERS | ORDERS @ HQDB SYNC PARENT = YES |
| | CUSTOMERS | CUSTOMERS @ HQDB ASYNC PARENT = NO |
| DB2 | ORDERS | ORDERS @ HQDB ASYNC PARENT = YES, READ ONLY = NO |
| | CUSTOMERS | CUSTOMERS @ HQDB ASYNC PARENT = YES, READ ONLY = NO |

FIG. 25

METHOD AND APPARATUS FOR DEFINING AND CONFIGURING MODULES OF DATA OBJECTS AND PROGRAMS IN A DISTRIBUTED COMPUTER SYSTEM

BACKGROUND OF THE INVENTION

1. Field of the Invention

The present invention relates to the field of computer systems employing distributed architectures. Specifically, the present invention pertains to the modeling of distributed systems.

2. Description of Related Art

Modern data processing systems, once the domain of large centralized mainframe computers, have evolved into collections of dispersed independent processing systems interconnected by networked links. That is, modern systems are distributed over many interconnected processing nodes. The efficiency of these distributed systems depends not only upon the processing power of each independent node, but also upon the ability of the system to efficiently move information between processing nodes across the network. It is common for these distributed data processing systems to support the execution of complex application programs which typically access large databases of information. These application programs and distributed systems must be capable of operating across multiple processing platforms which can be geographically separated by great distances.

For example, many commercial business operations are geographically dispersed. Some locations may perform manufacturing or product development while other locations perform sales, marketing, inventory control, billing, or various administrative functions. These business operations require the use of various types of business data including, for example, customer data, order data, shipping data, billing data, etc. It will be apparent to those of ordinary skill in the art that many other types of information may be required to allow a particular business operation to run efficiently. These various types of business information are stored in distributed systems for access by application programs executed by the data processing systems at the local and remote business locations. These data processing systems, called nodes herein, typically include computers, processors, or terminals physically resident at the same proximate location. The distributed systems being accessed by these complex application programs are typically comprised of many tables, arrays, files, and other complex interdependent data structures and related programs. Determining which of these data structures will need to be accessed from which processing nodes in a distributed system, given a particular type of access (i.e. create, read, update or delete), is a very difficult problem. An inefficient grouping of these data and program structures across the distributed system can render a distributed application virtually useless. In the business context, it is very difficult using prior art techniques to design an efficient distributed system architecture for a typical complex business model, given the numerous ways of distributing and sharing the various types of business data. Thus, a distributed system modeler is needed.

The application distribution and modeling process is further complicated by the availability of several distributed transfer technologies for moving information and control between distributed processing nodes. Each of these distributed transfer technologies are appropriate only for a limited set of circumstances. It is important to balance the requirements of a particular business model with the capabilities provided by particular distributed transfer technologies.

Two main types of distributed transfer technologies are available in the prior art: (1) distributed transactions and (2) replication. Distributed transactions is a methodology wherein one and only one copy of each data structure is made available for use by any of the databases of the distributed system. Using this methodology, a distributed data structure is resident on a single database called the local database. Other databases of the distributed system, i.e. remote databases, access this distributed data structure across the network through the local database. Typically, this remote access is performed using a conventional data manipulation language such as SQL or other conventional protocol. Alternatively, the remote database can use a remote procedure call (RPC) to activate a data access procedure on the local database in a synchronous RPC context. In a synchronous context, the remote database waits for the RPC to finish before completing the transaction. An RPC can also be used to queue a request on the local system in an asynchronous RPC context. In an asynchronous context, the remote database does not wait for the RPC to finish before completing the transaction. The use of a remote procedure call is well known to those of ordinary skill in the art.

Although remote databases in a distributed transaction methodology must access a distributed data structure through the local databases, the application program running on the remote node may execute as though the data structure was actually resident within the remote processing node. This concept, called transparency, is a conventional technique for hiding the particular data processing distribution configuration details from the application programs executing on each processing node. In this manner, the application program is not dependent upon a particular location of its application data.

The second conventional distributed transfer technology is replication. Using this methodology, multiple replicas or instantiations of data structures or programs can exist in more than one database in a distributed system. In a typical scenario, a remote database would be used to access a local node in which a desired distributed data structure is resident. The remote node would then transfer a copy of the data structure to itself for local processing without the need for distributed transactions. Although replication increases the speed of accessing a particular data structure, this methodology produces a problem of maintaining coherency between multiple replicas of the same data structure or program. For example, two different nodes may replicate a distributed data structure and concurrently modify the data structure differently. It then becomes very difficult to reconcile the two modified replicas or to merge the updates into a composite version of the data structure. Thus, multiple modifiable replicas of a data structure introduces a coherency problem.

Within the replication methodology, two basic conventional techniques are used for maintaining coherency among multiple replicas of the same data structure. First, synchronous replication may be used. In synchronous (not asynchronous) replication, each update or modification of a data structure is immediately replicated to all other replicas of the data structure existing on any other processing node of the distributed system as part of their local transaction. The data structure modification is not allowed to complete until all other replicas of the data structure have been similarly updated. In this manner, all replicas of the data structure across the distributed system are guaranteed to be the same. Although the synchronous replication methodology provides a simple means for maintaining distributed system coherency, this method is sensitive to network latencies and intermittent network failures and does not work at all for dormant clients. Dormant clients are those that cannot perform an update to a data structure within a predetermined time period. Because each data structure modification is stalled until all nodes have been updated, network delays impact each such modification. Further, synchronous replication does not provide a means for differentiating particular data access transactions as higher or lower priority. Thus, low priority accesses can still produce significant system delays when this result may be unnecessary.

The second conventional method for maintaining data structure coherency in a replication methodology is asynchronous replication. Using this method, local replicas of a particular data structure can be slightly different for a time until an asynchronous update is performed. In asynchronous replication, a distributed node can modify its local copy of a data structure without forcing a network access as in the synchronous replication methodology. At a predetermined time interval or on demand, all previously un-replicated distributed data structure modifications are combined into a minimal set of updates which are transferred across the network at one time and applied to all other replicas of the data structure. The asynchronous replication method provides a means for balancing network traffic over time. The asynchronous method also provides an effective means for tuning the performance of a particular distributed system; however, a problem of data update conflicts is introduced. Data update conflicts occur when two distributed nodes modify the same data object in a distributed data structure before the asynchronous update process has executed. In this situation, two data objects may be validly updated locally at two different distributed processing nodes; however, an invalid combination of the two data objects may be produced when the updates to the data objects are propagated to other nodes. Although these conflicts can usually be reduced, it is important in designing any distributed system to understand and minimize these conflicts as much as possible.

Another form of replication is procedural replication. In procedural replication, a procedure invocation is replicated to other nodes in a distributed system. This is different from an RPC in that the RPC only produces a procedure execution in the remote node. In procedural replication, a procedure execution is produced in both the local node and the remote node. As in the use of RPCs, both synchronous and asynchronous forms of procedural replication can be implemented. The synchronous form stalls the transaction until the procedure execution is completed, while the asynchronous form allows the transaction to continue before the procedure execution has completed.

The prior art has experienced many problems in trying to design and model these highly variable distributed systems. Often, trial and error is the only means for implementing a workable distributed system.

Thus, a distributed system modeler for modeling a distributed system architecture is needed.

SUMMARY OF THE INVENTION

The present invention is a distributed system modeler for modeling a distributed system architecture. The distributed system modeler includes logic for receiving interdependency information specifying interdependencies between a plurality of data objects and programs, logic for defining a plurality of modules, wherein each module of the plurality of modules represents a different grouping of a portion of the plurality of data objects and programs, logic for assigning the modules to nodes in a distributed system, and logic for a assigning a distributed transfer methodology between modules in the distributed system. The distributed system modeler includes logic for generating impact analysis criteria defining a quality of said distributed system. The impact analysis criteria includes performance metrics, conflict metrics, data object or program availability metrics, and transaction consistency metrics. The distributed transfer methodology includes a distributed transaction methodology, a synchronous replication methodology, an asynchronous replication methodology, and a procedural replication methodology.

It is therefore an advantage of the present invention that object interdependency information generated by a conventional software repository or other equivalent tool can be used to identify and model a set of data structure and/or program configurations arranged in an architecture on various databases of a distributed system. It is a further advantage of the present invention that interdependencies between particular data structures and/or programs can be identified and independently processed. It is a further advantage of the present invention that different distributed transfer mechanisms can be independently evaluated, modeled, or used for different data structures and/or programs between selected databases. It is a further advantage of the present invention that synchronous replication can be used for some data structures and/or programs and asynchronous replication can be used for other data structures. It is a further advantage of the present invention that any distributed transfer mechanism or any distributed data or program configuration can be modeled using the present invention.

These features and advantages of the present invention will be apparent from the accompanying drawings and from the detailed description of the present invention as set forth below.

BRIEF DESCRIPTION OF THE DRAWINGS

FIGS. 3–5 illustrate an example of a data/function interdependency matrix.

FIGS. 22–25 are examples illustrating the use of modeling information in the preferred embodiment.

DETAILED DESCRIPTION OF THE PREFERRED EMBODIMENT

The present invention is a distributed system modeler for modeling a distributed system architecture in a distributed data processing system. In the following detailed description, numerous specific details are set forth in order to provide a thorough understanding of the present invention. However, it will be apparent to one of ordinary skill in the art that these specific details need not be used to practice the present invention. In other instances, well known structures, interfaces, and processes have not been shown in detail in order not to unnecessarily obscure the present invention.

As described above, there are many variations on the distributed transfer technologies that can be implemented for a particular application. The scope of the present invention includes the use of any one or a combination of these or other distributed transfer technologies. In the following description of the invention, a reference to one of these distributed transfer technologies does not limit the scope of the invention to the referenced distributed transfer technology. Rather, the reference to a particular distributed transfer technology is intended as an example of the operation of the present invention and not a limitation to the referenced technology.

Figure 1:
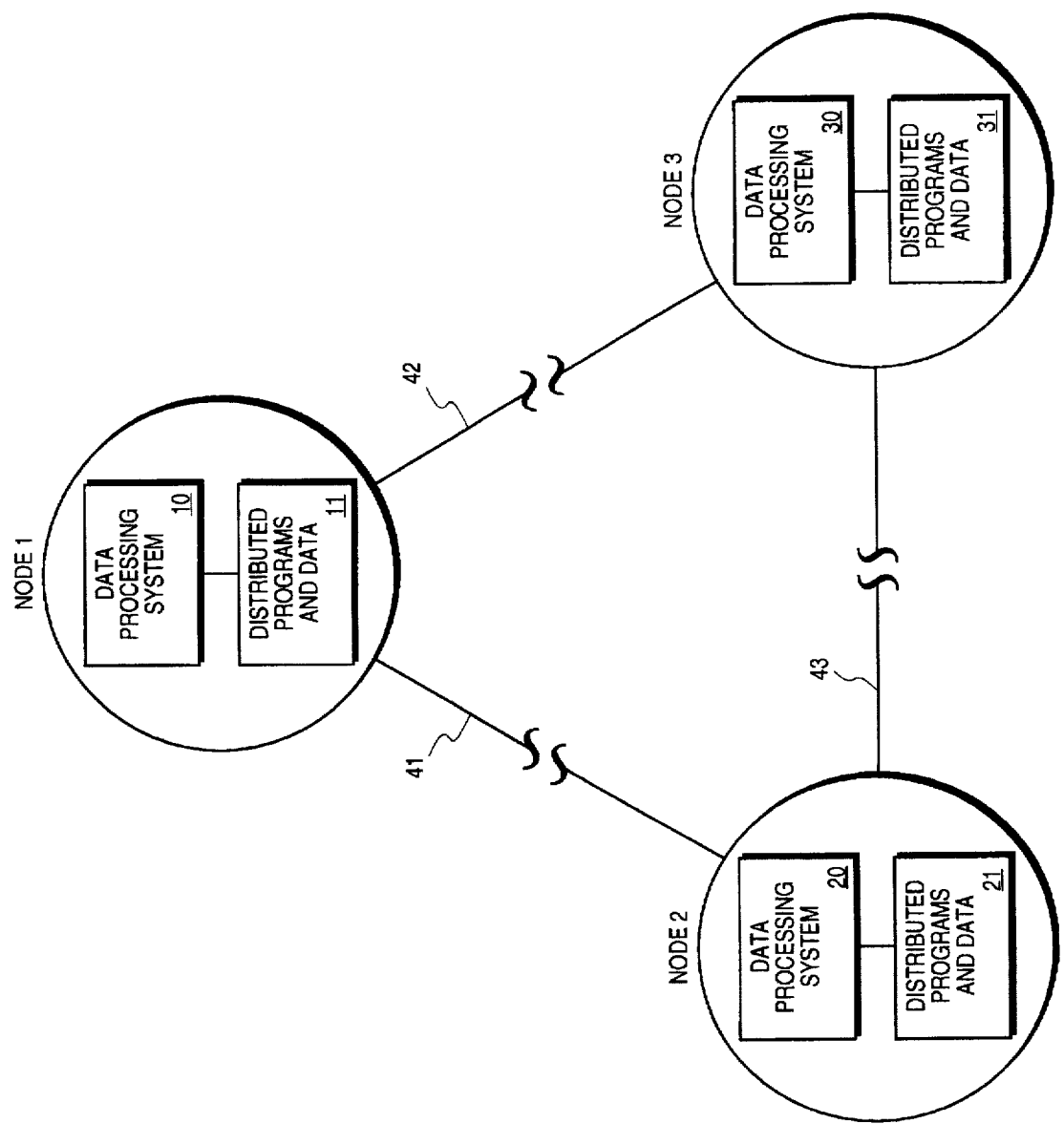
FIG. 1 illustrates a typical distributed data processing system.

FIG. 1 illustrates a typical distributed data processing system comprising node 1, node 2, and node 3 coupled together with network links 41, 42, and 43. It will be apparent to those of ordinary skill in the art that an arbitrary number of nodes in the distributed system may be supported in an arbitrary configuration. Each node, such as node 1, comprises a data processing system 10 and a set of distributed data 11 stored in a distributed data store (not shown). The distributed data store can be main memory 104 or mass storage device 107 shown in FIG. 2. A typical architecture of data processing system 10 is described below in connection with FIG. 2. Distributed data 11 comprises a set of data structures and data objects which may be shared or replicated by other nodes in the distributed system. Distributed data 11, for example, comprises a set of data structures available to other nodes in the distributed processing system. Data processing system 10 may directly access distributed data 11; because, distributed data 11 is local (i.e. located within the same node) to data processing system 10. In this situation, access between data processing system 10 and distributed data 11 does not require a network access. Typically, these local accesses can be performed more quickly than accesses requiring a network communication. Other nodes (node 2 and node 3) of the distributed system illustrated in FIG. 1 must access distributed data 11 via a network access. For example, node 2 and the data processing system 20 therein must access distributed data 11 via network link 41.

This network access can be the result of a distributed transaction or a replication operation, for example. As described above, other forms of distributed transfer technologies can cause network accesses. In a distributed transaction system, the data processing system 20 of node 2 accesses and manipulates distributed data 11 within the distributed data store of node 1. In a replication system, after a local version of the distributed data 11 within the distributed data store of node 1 has been transferred to the distributed data store of node 2, the data processing system 20 of node 2 accesses distributed data 11 within the distributed data store of node 1 locally within node 2. This local copy of the distributed data 21 within the distributed data store of node 2 may subsequently be manipulated locally by data processing system 20. By appropriately configuring the structure of distributed data 11, 21, and 31, the need for internode network communication can be minimized. It is the architecture of this distributed data that represents such a significant problem for prior art systems and which is solved by the methods and systems described in the present application.

The hardware architecture of nodes within the distributed processing system, such as the one illustrated in FIG. 1, can be varied and diverse. There is no requirement in the present invention that each node have equivalent and compatible processing systems. It is only necessary that each node of the distributed processing system be able to communicate on a network or some communication path coupling the nodes together.

Figure 2:
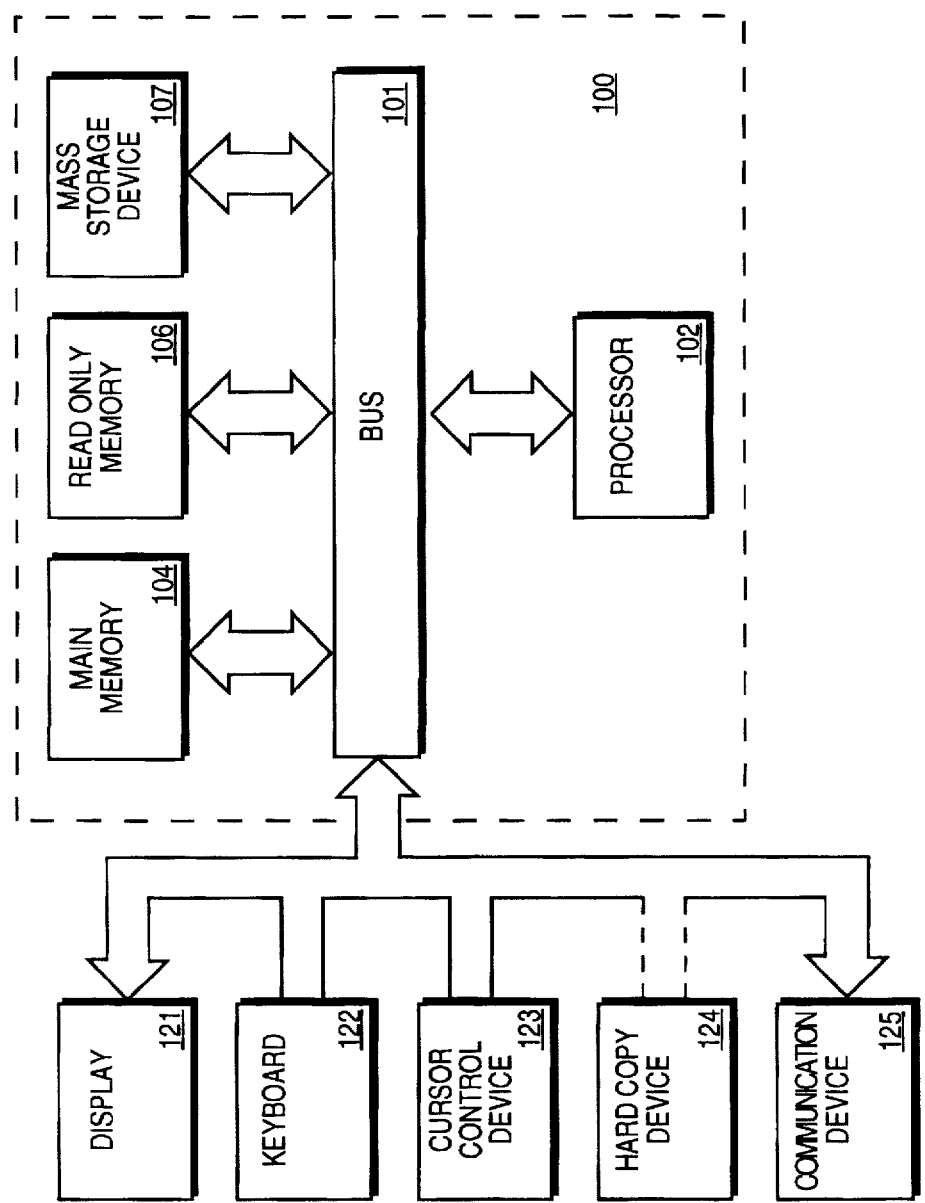
FIG. 2 illustrates a typical architecture of a data processing node within a distributed processing system.

FIG. 2 illustrates a typical data processing system upon which one embodiment of the present invention is implemented. It will be apparent to those of ordinary skill in the art, however that other alternative systems of various system architectures may also be used. The data processing system illustrated in FIG. 2 includes a bus or other internal communication means 101 for communicating information, and a processing means 102 coupled to the bus 101 for processing information. The system further comprises a random access memory (RAM) or other volatile storage device 104 (referred to as main memory), coupled to bus 101 for storing information and instructions to executed by processor 102. Main memory 104 also may be used for storing temporary variables or other intermediate information during execution of instructions by processor 102. The system also comprises a read only memory (ROM) and/or static storage device 106 coupled to bus 101 for storing static information and instructions for processor 102, and a data storage device 107 such as a magnetic disk or optical disk and its corresponding disk drive. Data storage device 107 is coupled to bus 101 for storing information and instructions. The system may further be coupled to a display device 121, such as a cathode ray tube (CRT) or a liquid crystal display (LCD) coupled to bus 101 for displaying information to a computer user. An alphanumeric input device 122, including alphanumeric and other keys, may also be coupled to bus 101 for communicating information and command selections to processor 102. An additional user input device is cursor control 123, such as a mouse, a trackball, stylus, or cursor direction keys coupled to bus 101 for communicating direction information and command selections to processor 102, and for controlling cursor movement on display device 121. Another device which may optionally be coupled to bus 101 is a hard copy device 124 which may be used for printing instructions, data, or other information on a medium such as paper, film, or similar types of media. In the preferred embodiment, a communication device 125 is coupled to bus 101 for use in accessing other nodes of the distributed system via a network. This communication device 125 may include any of a number of commercially available networking peripheral devices such as those used for coupling to an Ethernet, token ring, Internet, or wide area network. Note that any or all of the components of the system illustrated in FIG. 2 and associated hardware may be used in various embodiments of the present invention; however, it will be appreciated by those of ordinary skill in the art that any configuration of the system may be used for various purposes according to the particular implementation. In one embodiment of the present invention, the data processing system illustrated in FIG. 2 is an IBM compatible personal computer. Processor 102 may be one of the 80×86 compatible microprocessors such as the 80486 or Pentium™ brand microprocessors manufactured by Intel Corporation of Santa Clara, Calif..

The distributed data, such as distributed data 11 illustrated in FIG. 1, can be stored in main memory 104, mass storage device 107, or other storage medium locally accessible to processor 102. It will also be apparent to those of ordinary skill in the art that the methods and processes described herein can be implemented as software stored in main memory 104 or read only memory 106 and executed by processor 102. The preferred embodiment of the distributed system modeler of the present invention will be described next.

In order to model a distributed system for a distributed data processing system such as the one illustrated in FIG. 1, it is necessary to determine which data structures or programs must be made available to each node in the distributed system. It is also necessary to determine the nature of the basic application or business functions that will be operating on the distributed data for a given node. It is also necessary to analyze the nature and extent of any data integrity problems created by a particular configuration. In general terms, therefore it is necessary to determine the interdependencies between the distributed data objects and the available business functions for operating on these data objects in a particular distributed system. Knowledge of data interdependencies is a key issue in developing and modeling a distributed system.

It is possible to look outside the context of distributed systems for help in determining data interdependencies. One conventional technology for determining data interdependencies is the use of a CRUD (Create, Read, Update, Delete) diagram. A CRUD diagram defines the types of high level access to an object in terms of four types of access: 1) create, 2) read, 3) update, or 4) delete.

CRUD diagrams are sometimes produced by a case repository. Although the use of case repositories is a well known technology, it is not conventional methodology to use a case repository, or other type of repository, in connection with developing distributed systems. In general, case repositories have traditionally been used to support software design, development and maintenance. In this regard, a form of a case repository known as a source code repository also provides interdependency information; however, source code repositories typically include both data access and function or program access information and interdependencies. Thus, in the preferred embodiment of the present invention, a source code repository is used to obtain data object and program interdependency information at a more detailed and specific level than provided by a generic case repository. It will be apparent to those of ordinary skill in the art that there exists means other than a case repository for generating data object and program interdependency information.

Referring now to FIG. 3, a matrix illustrates an example of the output produced by a conventional case repository tool given a sample set of business functions and a sample set of business information used by these functions. In the matrix illustrated in FIG. 3, the rows of the graph represent individual business functions and the columns represent individual groups of business information. The conventional case repository analyzes the accesses made by the business functions to the business information. These accesses are represented by letters listed at the intersection of rows and columns illustrated in FIG. 3. These letters define various access types including create, read, update, or delete (i.e. CRUD) accesses. For example, the Maintain Customer business function both creams and updates (i.e. CU) portions of the customer information. Similarly, the Maintain Orders business function reads (R) customer information and creates, updates, and deletes (CUD) order information. Each of the other business functions identified in FIG. 3 access the identified business information in the manner illustrated by FIG. 3. Note that the lack of a letter at the intersection between the business function and the business information group indicates that the business function does not access the corresponding business information group.

Using this interdependency information produced, for example, by a conventional case repository tool, it is readily apparent that some business functions more heavily depend upon particular business information groups and may not depend at all on other business information groups. Using this information, the present invention is able to identify the combinations of business functions and business information groups that have a high degree of interdependency. In defining a distributed system architecture, it may be advantageous to configure highly interdependent functions and information groups within the same processing node. In this way, the accesses between the functions and the information groups can be local accesses as opposed to network accesses. It is further evident from the matrix illustrated in FIG. 3 that, if asynchronous replication is used, update conflicts may arise when two business functions, on different computers (nodes), attempt to update the same business information group. For example, both the Maintain Orders business function and the Ship Orders business function can update the Order Data business information group as illustrated in FIG. 3. Thus, it would be disadvantageous to locate the Maintain Orders business function and the Ship Orders business function on two different nodes of a distributed system. If these business functions are not co-located, an asynchronous replication methodology for maintaining coherency of the Order Data group may encounter undesirable update conflicts. These conflicts can be eliminated if the appropriate distributed system is designed based on the interdependency information illustrated by the example of FIG. 3. It is apparent that any of the other types of distributed transfer technologies described above can be employed in the resulting distributed system. Moreover, it can be appreciated that the interdependency information can be effectively used for appropriately placing data or distributed objects at particular nodes in order to minimize update conflicts and network traffic and maximize the availability of data or programs to certain nodes.

Referring now to FIG. 4, a matrix illustrates a more detailed representation of the interdependency information example of FIG. 3. In the matrix illustrated in FIG. 4, the columns of the matrix have been detailed to more specifically define particular data structures or programs of the business information represented in FIG. 3 by more broad categories. The data structures and programs illustrated in FIG. 4 include Customer data, Customer Address data, Order Header data, Order Line data, Order Shipment data, and Invoice data. If Order data, for example, is implemented as a table (i.e. the Order table), the Order Header and Order Line data objects represent columns or attributes of the Order table. Note that in this example, particular attributes or columns of a table are now being identified by the CRUD matrix. Thus, a lower level of detail is being introduced into the interdependency information.

The relationship between these data structures and the business functions that access them is defined by the letters at the intersections between the columns and rows as illustrated in FIG. 4. As described above in connection with FIG. 3, these letters define the various access types by which the business functions access the data structures. These access types include create, read, update, or delete (i.e. CRUD) accesses. In the example illustrated in FIG. 4, the Maintain Customer business function both creates and updates (i.e. CU) portions of the Customer data structure and the Customer Address data structure. Similarly, the Maintain Orders business function reads (R) the Customer data structure and creates, updates, and deletes (CUD) order data in the Order Header data structure and the Order Line data structure. Each of the other business functions identified in FIG. 4 access the identified data structure of the business information in the manner illustrated by FIG. 4.

As described above in connection with FIG. 3, this data interdependency information, such as the example of this interdependency information illustrated in FIG. 4, can be used to identify the combinations of business functions and data structures that have a high degree of interdependency. Because the business information in the example of FIG. 4 has been defined in more detail than the example illustrated in FIG. 3, the interdependency information is specified with a higher degree of granularity. Thus, the interdependency between functions and data can be determined with more precision. For example, it can be seen from the example of FIG. 4 that the Maintain Orders business function can create, update, and delete (CUD) Order Headers and Order Lines, but does not affect Order Shipment data. Similarly, the Ship Orders business function reads Order Header data and Order Line data but only updates Order Line data and creates Order Shipment data. Thus, it can be seen that as the business information is defined in more specific terms, the resulting interdependency information can be used to identify interdependencies and update conflicts with more precision.

Referring now to FIG. 5, another example illustrates the more specific definition of the business functions of the examples illustrated in FIGS. 3 and 4. In this case, the individual programs implementing the business functions identified in FIGS. 3 and 4 are specified along the left margin of the matrix illustrated in FIG. 5. For example, the Enter_Customer business program and the Maintain_Address business program implement the Maintain Customer business function illustrated in FIGS. 3 and 4. Similarly, the Enter_Order business program and the Change_Order business program implement the Maintain Orders business function. The other business functions of this example have been specified in more detail as business programs as shown in FIG. 5.

Because the business functions of the example illustrated in FIG. 5 have been broken down into a more granular set of business programs, the interdependency information, as shown in FIG. 5, is more precise. Such a set of interdependency information may be produced by a conventional source code repository. For example, it can be seen that the Enter_Customer business program creates Customer data; but, the Maintain_Address business program creates and updates only Customer Address data. Similarly, it can be seen from the example of FIG. 5 that an update conflict will occur for the Order Line data structure between the Change_Order business program and the Print_Pickup_Slip business program.

Thus, the interdependency matrix illustrated by example in FIGS. 3, 4, and 5 provides a means for associating business programs or executables (denoted programs herein) with data structures or data objects being accessed by these programs at increasing levels of detail or granularity. In addition to programs, the interdependency matrix identifies the type of data access (i.e. create, read, update, or delete) being made by a program to a data structure. Note that as a more detailed breakdown of the business functions and the business information is provided, the resulting interdependency information is more precise. However, as more detail is added to the business function and business information breakdowns, the more difficult it becomes to comprehend the complexities of the interdependencies. It is therefore important to balance the level of precision provided by the interdependency matrix with the ability to handle the complexity. Module representations hide the complexity through a convenient and flexible mechanism. Thus, the present invention provides a capability for grouping related programs and data structures into aggregates called modules.

A module in the present invention is an arbitrary grouping of programs and data structures that collectively constitute a business function. By providing a capability for aggregating programs and data together into modules, the size of the interdependency matrix such as those illustrated in FIGS. 3, 4, and 5, can be reduced and the complexity of the interdependency information can be minimized. Modules can be the units of distribution across a distributed set of processing nodes. When a module is specified as residing at a particular location or within a particular node, all data and/or programs comprising the module are defined as resident at the specified location or with the specified node. Module definitions can also be used, but do not have to be used, to conveniently identify particular business entities or business processes associated with a particular business application. Once module definitions for the business programs and business data structures for a particular business are defined, the interdependency matrix can be used to identify the interdependencies and potential update conflicts between or within modules.

Figure 6:
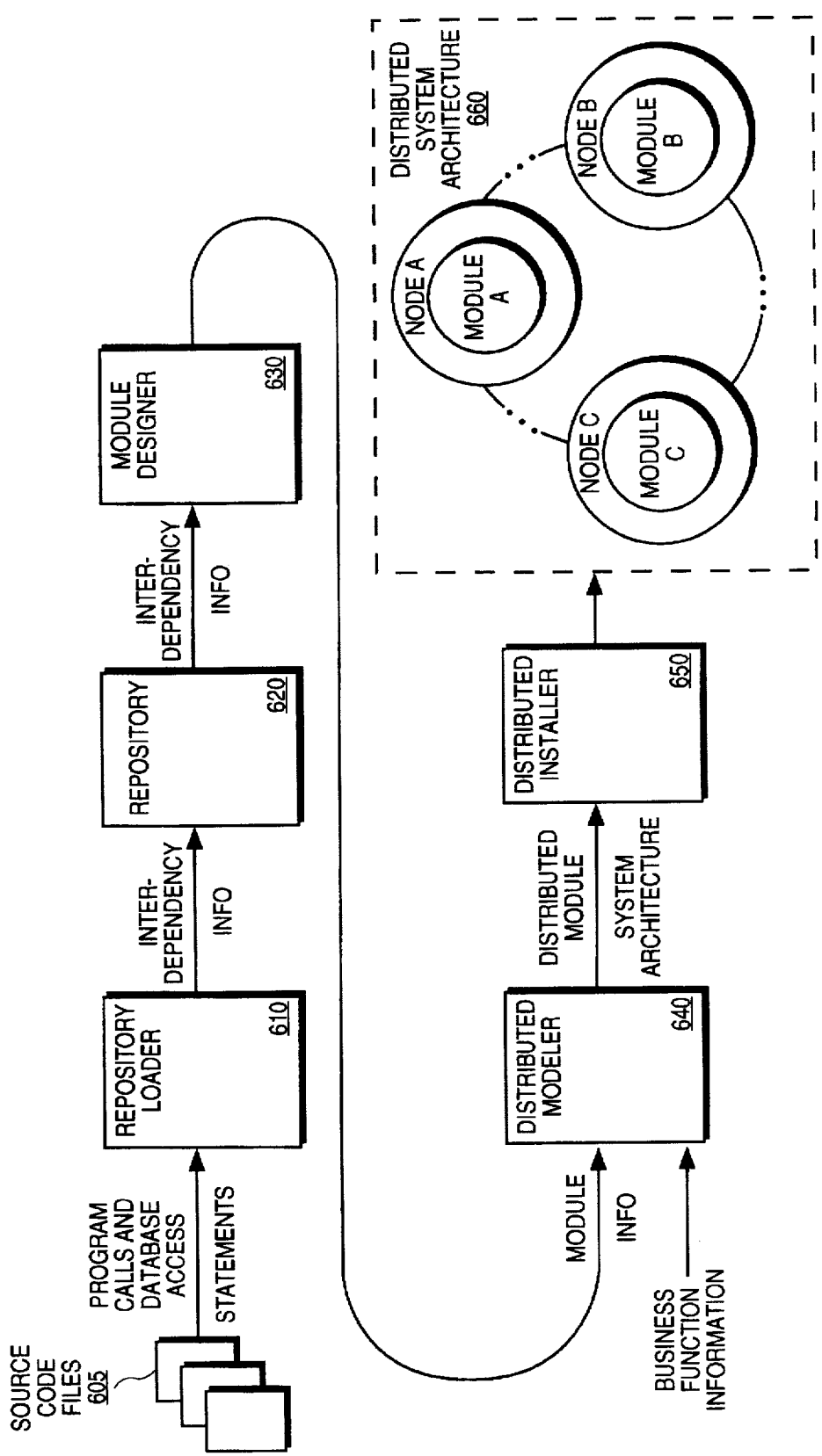
FIG. 6 illustrates the components of the system of the present invention.

In the preferred embodiment of the present invention, distributed systems are modeled and deployed using a module representation and interdependency information in five different processing stages. Referring to FIG. 6, these five stages include: 1) a source code repository loader 610, 2) a source code repository 620, 3) a module designer 630, 4) a distributed system modeler tool 640, and 5) a distributed system installer 650. The source code repository 620 (herein the repository) is used for storing information about program or function calls, database access statements and coding standards conformance information. In the preferred embodiment of the present invention, a source code repository is used to obtain a greater level of detail into the interdependencies of the data objects and program calls as discussed earlier. It will be apparent to those of ordinary skill in the art, however that types of repositories other than source code repositories may equivalently be used as part of the claimed invention. In the preferred embodiment of the present invention, the database access statements are Structured Query Language (SQL) statements used for accessing tables and columns within tables in a conventional database. It will be apparent to those of ordinary skill in the art, however that other types of database access statements may equivalently be used.

The repository 620 is used for generating and maintaining information pertaining to program calls and data access statements in a format that accommodates easy analysis, classification, and retrieval. This information includes information representing relationships between the tables and columns in the database access (SQL) statements, information specifying where tables and columns are used, and information specifying how the tables and columns are used by a particular database access statement. The repository 620 also stores information representing relationships between programs or functions. The use of programs or functions in a software system is well known in the art. The repository 620 maintains information representing relationships between source code files and the program calls and database access statements within them. Indirectly, this also provides information specifying the nature of the interdependencies of programs and database accesses between source code files. Because both program calls and database accesses are tracked at a low level, all of the program call and database accesses performed from a particular source code file can be determined from information stored in the repository 620.

The repository loader 610 includes a set of parsers for extracting database access and function/program callable unit interdependency information from a set of software units or source code files 605 containing source code. The repository loader 610 extracts this information from the source code files 605 and loads the information into the repository 620 using an application program interface (API).

The module designer 630 is a tool for analyzing the behavior of distributed system applications. The module designer 630 provides a means for dividing a database application into modules which can be independently distributed across a network of processing nodes and databases. The module designer 630 of the present invention also provides a means for choosing a module definition which performs a number of useful functions including, minimizing inter-module accesses, reducing potential database update conflicts, and improving the locality of reference for a particular module definition. Locality of reference, as well known in the art, is the characteristic of confining object dependencies, as much as possible, to a local set of objects. The modules produced by the module designer 630 are groups of database objects, APIs, and executable programs all related to a single purpose or business function. The module designer 630 provides a means for combining data and programs in convenient and efficient ways for distribution across a network.

Once the modules for a particular application have been defined, the distributed modeler 640 is used for defining business models and for designing distributed systems. The distributed modeler 640 of the present invention provides a means for defining a business model comprising business locations and the business functions that occur at each business location. The distributed modeler 640 further provides means for designing distributed systems that satisfy the specified business model. The distributed modeler 640 of the present invention provides means for specifying a distributed system and for modeling various aspects of the architecture, such as the performance characteristics of the specified model. A specified distributed system architecture can be easily modified using the distributed modeler 640 and the characteristics of the modified architecture can be analyzed in an iterative process. In this manner, a user can design a distributed system architecture that satisfies the specified business model while satisfying a set of criteria including, maintaining data availability, maintaining an acceptable performance level, and maintaining data integrity.

The distributed installer 650 of the present invention is a tool for instantiating or deploying distributed systems 660 produced by the distributed modeler 640. The distributed installer 650 installs the data and program components of each module and sets-up data propagation methods between distributed systems. The distributed installer 650 thereby provides a convenient means for high level installation of an architecture 660 modeled by the distributed modeler 640 without the need to manually enter a large number of commands to effect the installation.

Figure 7:
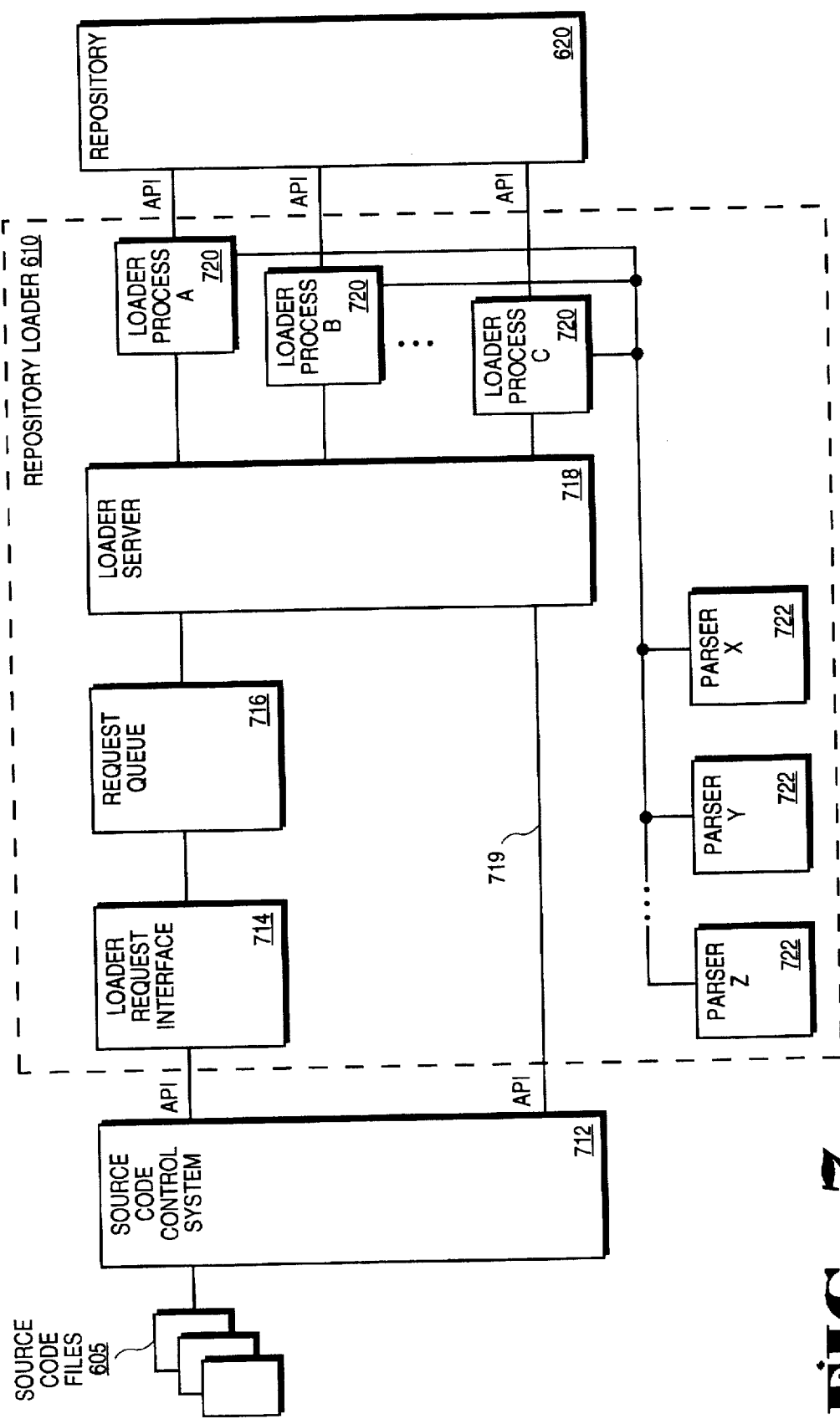
FIG. 7 illustrates the architecture of the repository loader.

Referring now to FIG. 7, a block diagram illustrates the internal architecture of repository loader 610. Repository loader 610 can be coupled to a Source Code Control System (SCCS) 712 through an API. In other alternative embodiments, the repository loader 610 is coupled to other sources of source code files. The SCCS 712 is a conventional source code control system providing a means for controlling the check-in and check-out of source code files 605. Source code files 605 comprise files or other operating system information blocks which include the source code for a portion of a particular software system such as an application program. These source code files 605 are checked into SCCS 712 using conventional means. When a source code file 605 is checked into SCCS 712, SCCS 712 notifies repository loader 610 through an API. A loader request interface 714 of repository loader 610 receives the request to process the source code file 605. Alternatively, the loader request interface 714 may receive more than one request or batch requests to process a source code file 605. This request or these requests to process a source code file 605 are queued in a request queue 716. In other alternative embodiments, the queue 716 is loaded by systems other than a SCCS 712. For example, requests to process source code files 605 can be manually entered into queue 716 or supplied by an application or operating system process. Periodically, loader server 718 wakes-up from an inactive state and retrieves a request from request queue 716. A loader process 720 is activated by loader server 718 to process the request. If the request was made by the SCCS 712, the server 718 checks out the file corresponding to the request from SCCS 712 through an API 719. If the request was made from another system, the server 718 gains access to the source code file in a manner compatible with the other system. The file 605 is placed in a work area accessible to repository loader 610. Once a loader process 720 associated with the request has been launched by loader server 718, the loader process 720 examines the file identifier extension of the source code file 605 corresponding to the request. Depending upon the type of the file as determined by the file extension, the loader process 720 launches one of the parsers 722 corresponding to the type of file. Each parser 722 examines the source code file 605 for a particular type of data corresponding to the type of parser. The parsed output is stored in a temporary output file (not shown). The loader process 720 monitors the progress of all parser processes launched. After all appropriate parser processes have successfully parsed the file, the loader process 720 uses an API to transfer the output of the parser into the repository 620.

In the preferred embodiment, the loader server 718 controls the number of running requests at a given time. Loader server 718 makes sure that the number of running requests does not exceed an allowable predetermined maximum number. Loader server 718 goes to sleep after it has processed all or a predetermined number of requests from request queue 716. When loader server 718 wakes-up after a set period, loader server 718 checks to see if there are any requests in request queue 716 to be processed.

Loader processes 720 handle one request each. Each loader process 720 launches parsers 722 to parse source code files 605 for data and then transfer the parsed data into repository 620.

Parsers 722 must understand the grammar of each type of file read and the grammar of database access statements such as SQL in order to generate the appropriate data for repository 620. If a parser 722 does not understand the grammar of its input source code file 605, the parser does not generate any output. Similarly, a parser 722 does not generate any output for an invalid database access statement.

In the preferred embodiment, the repository loader 610 uses mainly a compiler-compiler (a parser generator) to build its parsers. In other circumstances, other programs may be used to preprocess input files for parsers when it is more efficient to do so. In the preferred embodiment, the parsers 722 of repository loader 610 can parse C functions, Oracle™ Forms, Oracle Reports, RPT, PL/SQL stored procedures, database triggers, SQL scripts, and PL/SQL scripts. It will be apparent to those of ordinary skill in the art, however that other types of well known parsers may equivalently be used within repository loader 610.

One important data item parsed and transferred to repository 620 by repository loader 610 is an indication of calls to software modules or function calls made within source code files 605. These function calls represent the relationship between software modules. Repository loader 610 attempts to resolve function references within source code files 605. If necessary, dummy functions are used in place of unresolved references during the parsing process.

Figure 8:
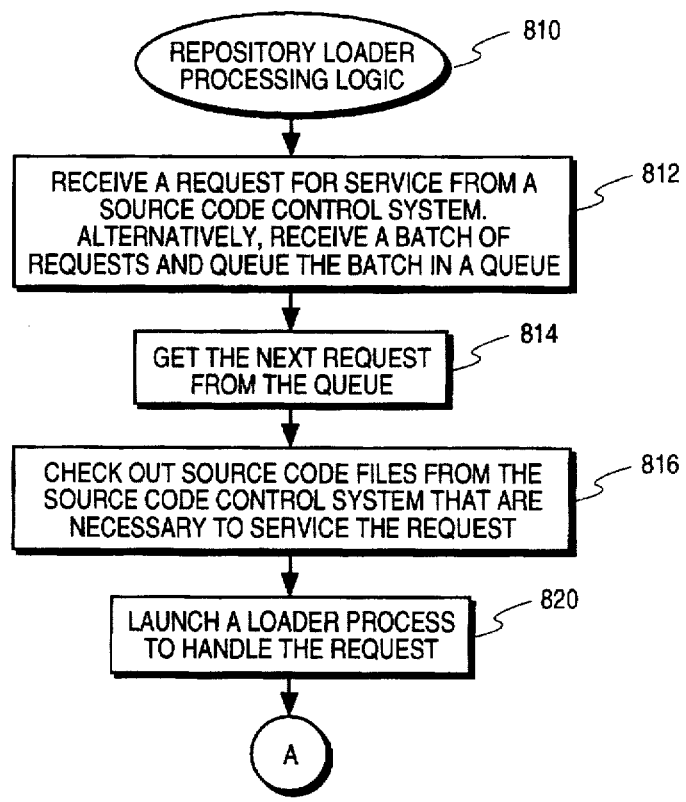
FIGS. 8–9 are flow diagrams illustrating the processing flow for the repository loader.
Figure 9:
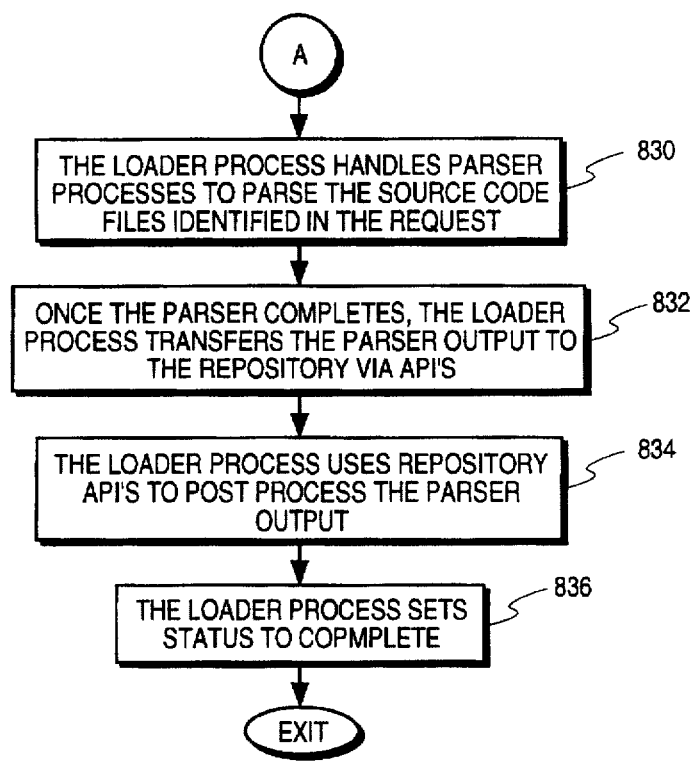

Referring now to FIGS. 8 and 9, flow charts illustrate the processing logic performed by repository loader 610. Repository loader 610 receives a request for service from source code control system 712 in processing block 812. Alternatively, repository loader 610 may receive a batch of requests for service of source code files 605. These requests are stored temporarily in request queue 716. Periodically, loader server 718 wakes-up and gets the next request from request queue 716 in processing block 814. Source code files 605 corresponding to the request are checked out of SCCS 712 by loader server 718 in processing block 816. Loader server 718 then launches a loader process 720 to handle the request in processing block 820. Processing for the repository loader then continues at the bubble labeled A illustrated in FIG. 9.

Referring now to FIG. 9, the processing for the repository loader continues at the bubble A. The loader process 720 launched by loader server 718 identifies a parser corresponding to the type of the source code file 605 corresponding to the request (processing block 830). The appropriate parser 722 is launched by loader process 720 and the parser 722 parses the source code file 605 corresponding to the request. Once the parser 722 completes, the loader process 720 transfers the parser output to the repository 620 via APIs (processing block 832). The loader process 720 then uses repository 620 APIs to post process the parser output in processing block 834. The loader process 720 sets a status indicator to complete in processing block 836 and processing for the repository loader 610 completes through the exit bubble illustrated in FIG. 9.

Figure 10:
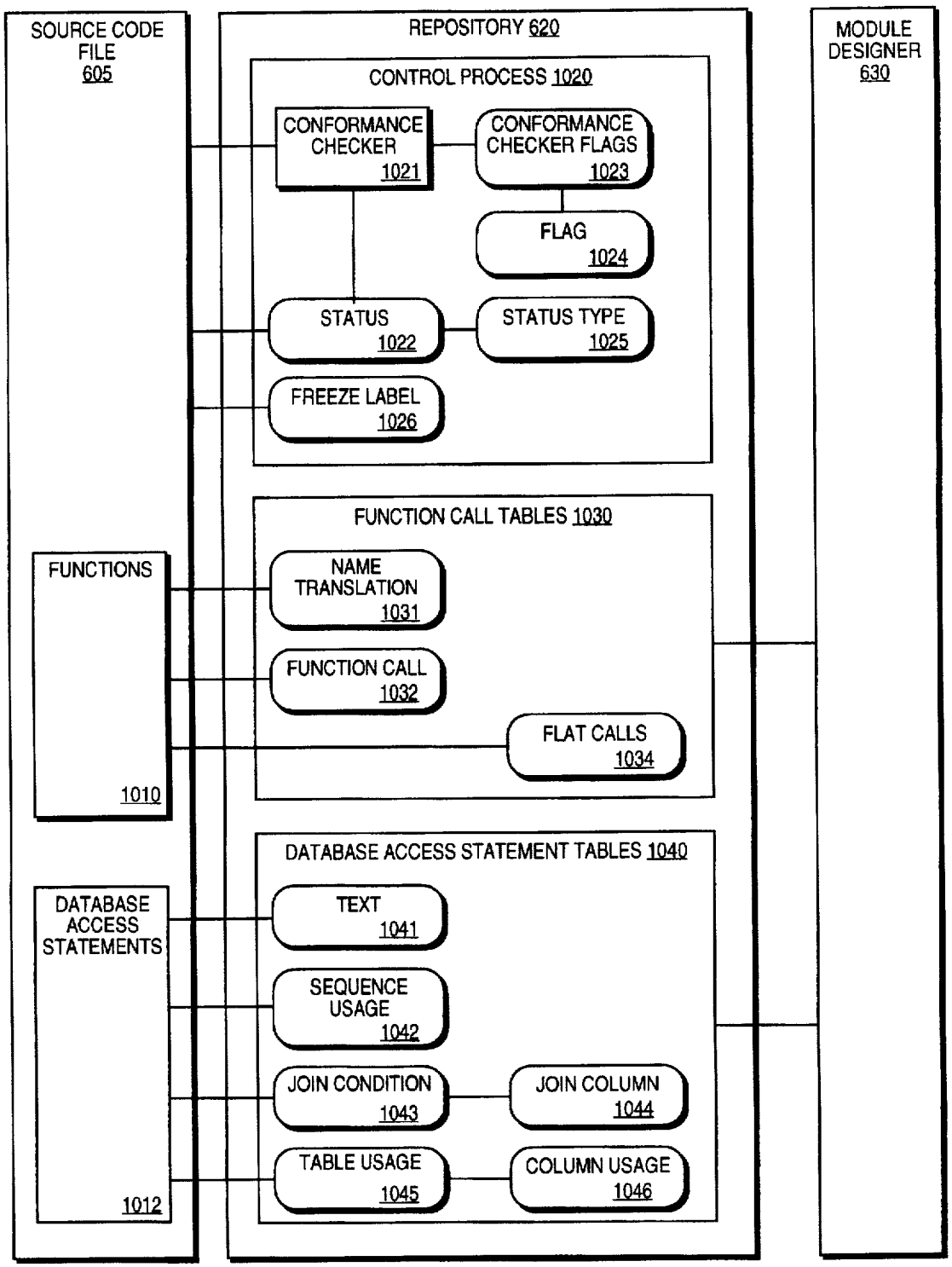
FIG. 10 illustrates the architecture of the repository of the preferred embodiment.

Referring now to FIG. 10, the internal architecture of repository 620 is illustrated. Repository 620 extracts and stores information from a source code file 605 including function and function call information 1010 and database access statement information 1012. Relationships between functions such as which functions call which other functions is extracted and maintained by repository 620. Relationships between tables and columns in database access statements in source code file 605 are also extracted and stored in repository 620. In the preferred embodiment, repository 620 also includes a means for enforcing coding standards through the use of a conformance checker 1021. This aspect of the present invention is described in more detail below.

Referring again to FIG. 10, a source code file 605 typically includes a large number of function calls 1010 within the source code. In addition, especially in database related applications, source code file 605 often includes a number of database access statements 1012 which are embedded within the code. Using the function call tables 1030 and the database access statement tables 1040 of repository 620, the interdependencies between functions 1010 and database access statements 1012 of an input source code file 605 can be extracted and recorded. In addition, coding standards can be checked and enforced using control process 1020.

Control process 1020 comprises a conformance checker 1021. In the preferred embodiment, conformance checker 1021 is comprised of a plurality of PL/SQL procedures that each check source code file 605 for compliance with a particular standard. In addition, conformance checker 1021 checks for changes in data access which may require a change to the distribution architecture or may cause update conflicts. Conformance checker flags 1023 are used to enable or disable each of the individual standards procedures of conformance checker 1021. If a particular standards checking procedure is enabled for source code file 605 as defined in conformance checker flags 1023, the PL/SQL procedure performing that standards check is called by conformance checker 1021. Either compliance or non-compliance indications are recorded in status table 1022. Status 1022 generated by conformance checker 1021 can be grouped into status groupings as defined by status type 1025. In this manner, particular classes or groups of status can be filtered. Flag table 1024 provides a means for globally enabling or disabling conformance checker 1021. Freeze label 1026 is used for storage of a freeze or version identifier associated with source code file 605.

Repository 620 includes function call table 1030 for storing function call interdependencies 1010 from source code file 605. Function call tables 1030 include a name translation table 1031. In some circumstances, it is necessary to convert one function call name to another. This may be the case, for example, for some library calls or use of user exits. The name translation table 1031 is used for forming a correspondence between the original name of the function and the new name of the function.

Figure 11:
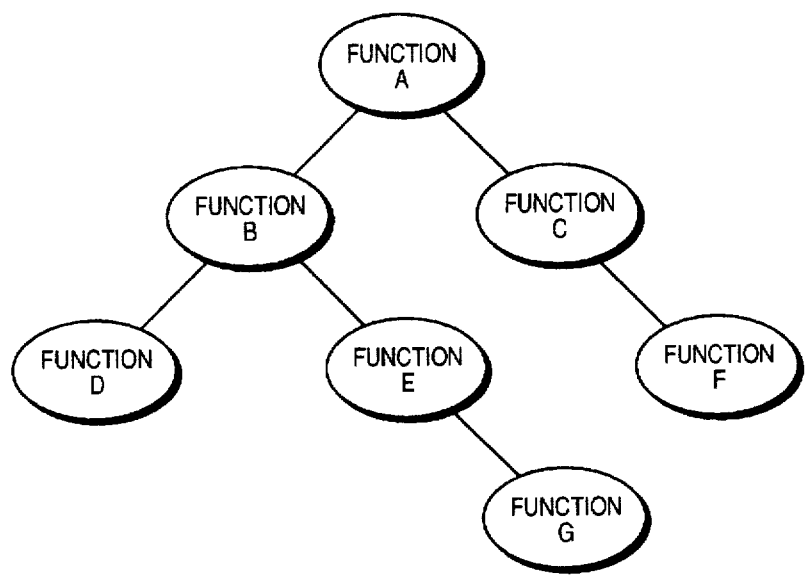
FIGS. 11–13 are examples illustrating the manipulation of function call information.

Function call table 1032 is used for the storage of information specifying which functions call other functions. Referring now to FIG. 11, a sample function call hierarchy is illustrated. In this example, function A calls function B and function C. Function B calls function D and function E. Function C calls function F and function E calls function G. In this example, a hierarchy is established when some functions directly call others while other functions are indirectly called. In order to record function call interdependencies, it is necessary to store this function call hierarchy. In the preferred embodiment, this function interdependency information is stored in function call table 1032. This information is used by other portions of the system for determining functional interdependencies.

Figure 12:
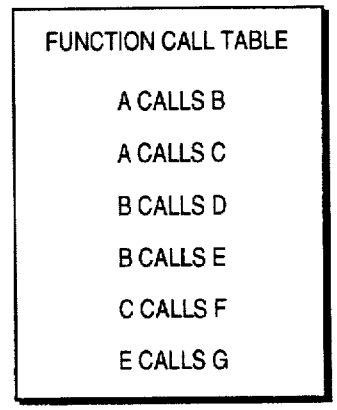
Figure 13:
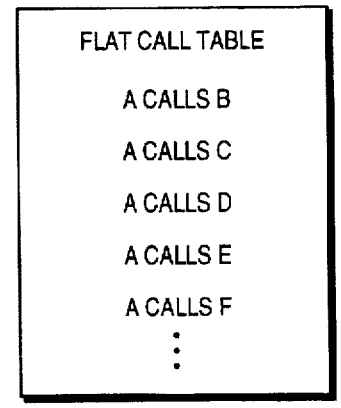

Referring again to FIG. 10, function call tables 1030 also includes flat call table 1034. Flat call table 1034 stores functional interdependency information in a form that is more efficiently searched by other processes. In addition, the flat call table 1034 improves performance and reduces complexity in the search for function call interdependencies. Referring now to FIG. 13, the content of flat call table 1034 is illustrated for the example functional hierarchy illustrated in FIG. 11. Although the functional hierarchy of the example illustrated in FIG. 11 is retained in function call table 1032 as illustrated in FIG. 12, the function call table 1032 cannot be as efficiently searched as flat call table 1034. For example, it may be necessary to determine if function A calls function E. Using function call table 1032 to determine this sample interdependency, the entire call tree starting at function A must be traversed through the use of function call table 1032. In contrast, flat call table 1034 is used for storage of information defining whether an interdependency exists between any two functions. Thus, in the example of FIG. 11, flat call table 1034 may be directly accessed to determine if an interdependency exists between function A and function E as illustrated in FIG. 13. Flat call table 1034 improves the performance of other systems using interdependency stored in repository 620.

Referring again to FIG. 10, database access statement tables 1040 are illustrated. Source code file 605 includes a plurality of database access statements 1012. These statements are parsed by the repository loader 610 and important information extracted therefrom is stored in database access statement tables 1040. For example, the text of a particular database access statement is stored in text table 1041. Sequence usages within a database access statement is stored in sequence usage table 1042. Database access statements 1012 often include join conditions where one portion of a database item or column is joined to another portion of the database. These join operations are parsed and stored in join condition table 1043 and join column table 1044. The repository loader 610 parses portions of a join operation in a database access statement 1012 and stores the condition portion in join condition table 1043 and the join operands in join column table 1044.

Database access statements 1012 typically operate on a table and/or a column of a table in a database. The table usage defined by a database access statement is stored in table usage table 1045. The column usage information within a database access statement is stored in column usage table 1046. Thus, each of the significant components of a database access statement 1012 is stored in a dedicated table within database access statement process 1040.

It is important to note that the content of these tables as illustrated in FIG. 10 relate directly to the CRUD diagram dependencies illustrated in FIGS. 3–5. The business function and business information dependencies illustrated in the CRUD diagrams have been detailed in the function call and database access statement tables maintained in the repository 620.

Figure 14:
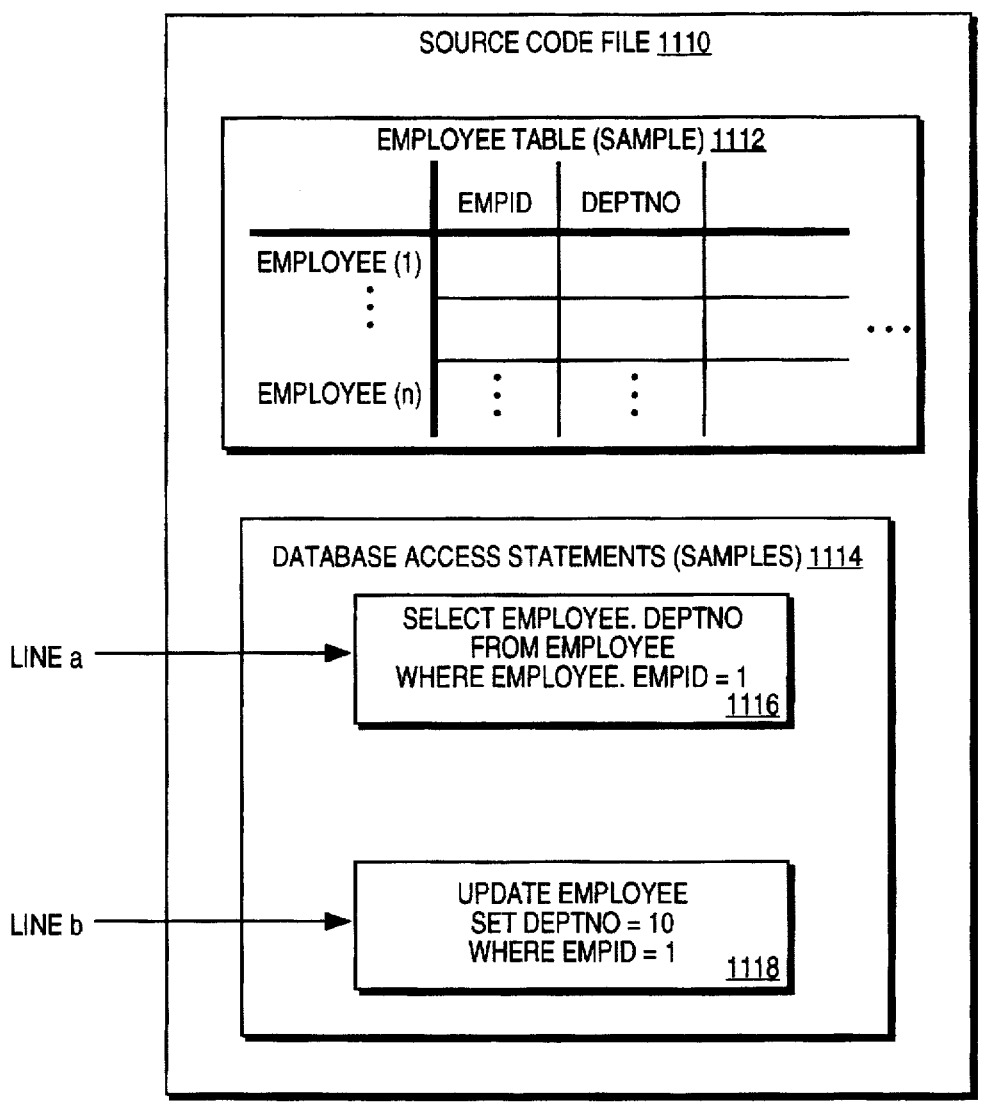
FIG. 14 is an example illustrating the content of a source code file.

Referring now to FIGS. 14 through 18, examples illustrate the operation of repository loader 610 and the storage of information in repository 620. Referring to FIG. 14, a sample portion of a source code file 1110 is illustrated. The sample source code file includes a table called EMPLOYEE 1112. The EMPLOYEE table 1112 includes a plurality of rows or records each corresponding to an individual employee in some business entity. It will be apparent to those of ordinary skill in the art that the examples illustrated in FIGS. 14 through 18 are merely illustrative of the principles of the present invention. In the example of FIG. 14, the EMPLOYEE table 1112 includes a plurality of columns or attribute fields providing partitioned information for each employee record. In this example, the EMPLOYEE table 1112 includes an EMPID field indicating an employee identifier and a DEPTNO indicating a department number for each employee for which information is stored in EMPLOYEE table 1112. In this example therefore, the table name is EMPLOYEE and the column names are EMPID and DEPTNO. As a commonly used programming notation, the reference to a particular column within a table is defined as <table name>.<column name>.

Referring still to FIG. 14, two sample database access statements 1116 and 1118 are illustrated. In the first sample database access statement 1116, a select operation is specified on the DEPTNO column of the EMPLOYEE table with a where clause qualifying the selection operation. Note that a "select" operation, as well known in the prior art, is a "read" (i.e. not an update) statement. Once the repository loader 610 parses this sample statement, the information stored in repository 620 is illustrated in FIGS. 15 and 16.

Figure 15:
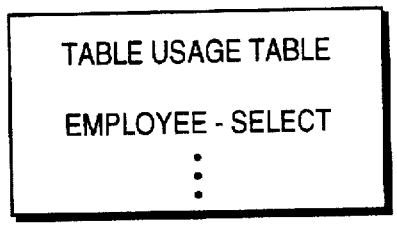
FIGS. 15–18 are examples illustrating the parsing capability used in the preferred embodiment.
Figure 16:
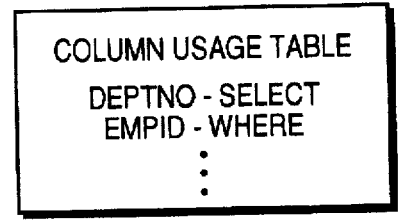

Referring now to FIG. 15, the table usage table 1045 is illustrated as containing an identification of the table name and the operation performed on that table by the sample database access statement 1116 illustrated in FIG. 14. Similarly, FIG. 16 illustrates the resulting content of column usage table 1046 after repository loader 610 has parsed the statement and stored the information in repository 620. In FIG. 16, the column usage table 1046 is shown as containing a correspondence between the column names and the corresponding operations on those columns performed by the sample database access statement 1116 illustrated in FIG. 14. Note that in this example, the tables and columns accessed and the operations by which they are accessed are recorded within repository 620.

Figure 17:
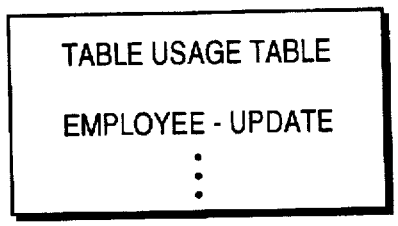
Figure 18:
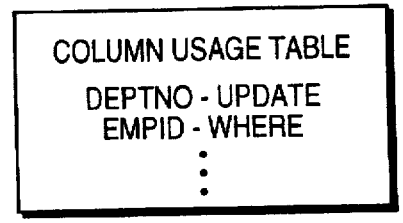

Referring now to FIG. 14, a second sample database access statement 1118 is illustrated. In this example, an update operation is being performed on the EMPLOYEE database. FIGS. 17 and 18 illustrate the resulting data stored in repository 620 following the parsing of database access statement 1118. Referring to FIG. 17, table usage table 1045 contains an identification of the table name (EMPLOYEE) and the operation (update) performed on that table. Similarly, column usage table 1046 contains an identification of the column names and the operations performed on those columns by the database access statement 1118. Note that by retaining the operation performed on either a table or a column, it can be determined on a table or column basis whether or not a read or update operation occurred. This is important information for many purposes including determining whether or not update conflicts occur between modules and maintaining consistency between objects. Having described the information stored in repository 620, the usage of this information by module designer 630 and distributed modeler 640 will now be described.

Figure 19:
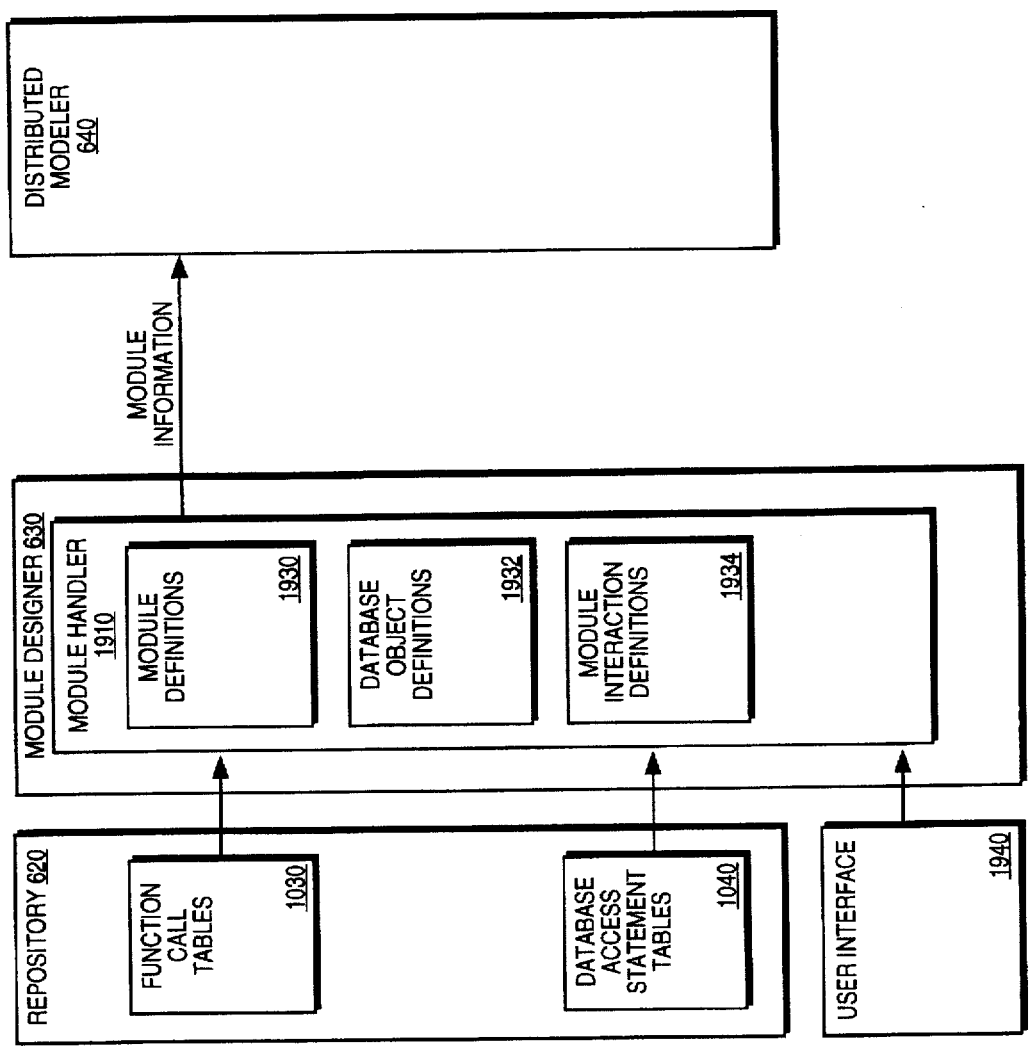
FIG. 19 is an architecture diagram of the module designer of the present invention.

Referring now to FIG. 19, repository 620 is shown as including function call tables 1030 and database access statement tables 1040 as described above. The information stored in these tables is used by module designer 630. Module designer 630 is used for grouping database objects and programs into manageable components called modules. Each module represents a higher level distributable entity or business function. Module designer 630 supports the definition of modules through the analysis of interactions between modules. Defining modules is an iterative process. The constituent pieces of a plurality of source code files can be assigned to modules by any criteria. For example, an application program corresponding to a set of source code files may be assigned into modules based upon the business function that a table or program is supporting. After the initial assignment is performed, further refinement of the definition is done by analyzing the interactions between modules and the locality of reference characteristics within modules. Module designer 630 provides the capability for both the initial assignment of modules and the refining of the module definitions through this iterative process. Module designer 630 also supports building larger aggregate modules, called module groups from smaller modules. Different business models can be developed as module groups and analyzed using the module designer 630.

Module designer 630 comprises a module handler 1910. Module handler 1910 is responsible for accepting a user specified module definition through user interface 1940 and for providing an analysis of the proposed user module definition in light of the function call and database access statement interdependency information retrieved from repository 620. Modules are defined by a user through user interface 1940 as groups of database objects and programs all related to a single purpose. A common way of defining modules is based on business functions. For example, all of the tables, sequences, forms, and reports related to a particular business function can be grouped into a single module. The initial definition of modules should be considered to be an estimate or approximation of the ultimate module definition. Refinement of a module definition requires changing of assignments of database objects and programs from one module to another. This refinement is performed using an analysis of inter-module access and intra-module access as provided by module designer 630 through user interface 1940. If for example a particular program is primarily accessing objects in another module, the program should be considered for reassignment to the other module. Moreover, if a database object is primarily accessed from another module, the object should be considered for reassignment.

Module handler 1910 includes module definitions tables 1930. These tables are used for storage of information pertaining to module designs, module groups, and the database objects and programs corresponding to particular module identifiers. Database object definitions tables 1932 is used for storage of database objects including tables, views, indexes, triggers, columns, and sequences. These objects are associated with modules in the module definitions tables 1930. Module interaction definition tables 1934 are used for storage of executable program information including program object usages and program column usages for particular database objects.

Figure 20:
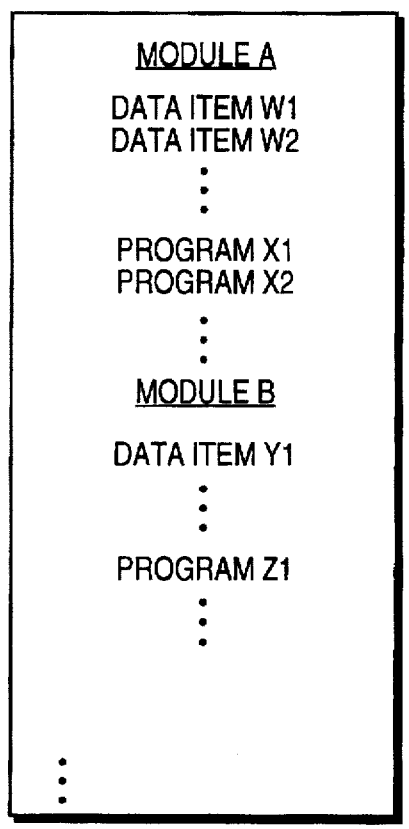
FIG. 20 is an example of the module information produced by the module designer.

A sample of the content of the module information is illustrated in FIG. 20. As shown in FIG. 20, the module information associates a module identifier with the component data objects and programs which comprise the particular module. This information is used by the distributed modeler 1640 to produce a distributed system architecture 660.

Figure 21:
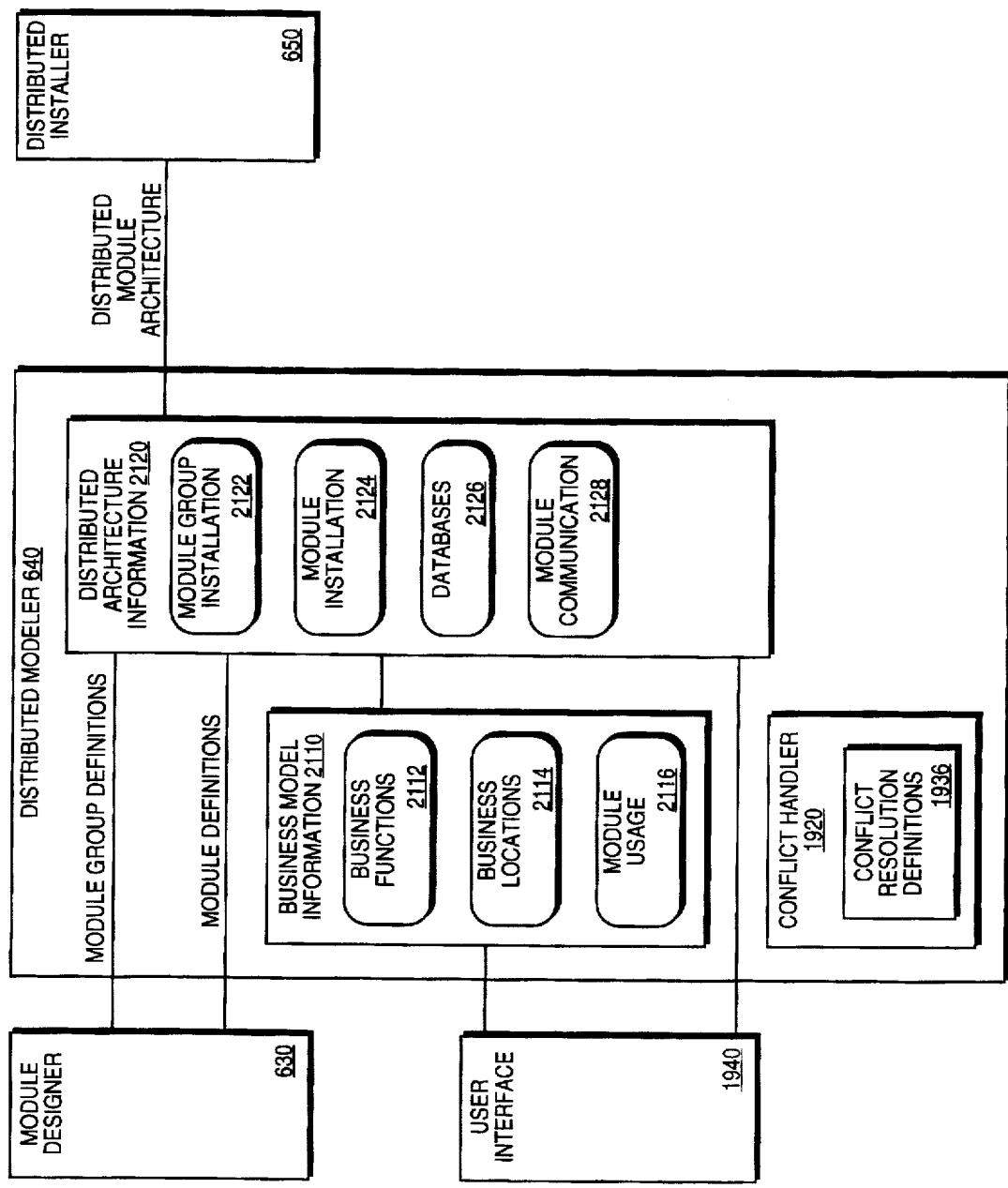
FIG. 21 is an architecture diagram of the distributed modeler.

Referring now to FIG. 21, the architecture of the distributed modeler 640 is illustrated. Distributed modeler 640 provides a means for defining business models and for designing distributed systems. Distributed modeler 640 uses the module group definitions and module definitions provided by module designer 630 described above. These module group and module definitions are combined with a business model definition 2110 as specified by a user through user interface 1940. Distributed modeler 640 allows a user to design a distributed system architecture that satisfies a specified business model. After choosing the best distributed system architecture for the business need, users can then use the distributed installer 650 for deploying the chosen distributed system. Users can employ distributed modeler 640 to create business models and distributed systems that have many business locations, physical databases, use many distributed mechanisms, and contain many installations of a module. Users initially define business models and design configurations at the module group level. Users assign module groups to databases, then distributed modeler 640 takes care of assigning the underlying modules to each database. Using modules and module groups lets users deal with fewer units of distribution and allows the creation of a distributed system more quickly.

Distributed modeler 640 includes business model information 2110. This business model information 2110 includes business functions 2112, a specification of business locations 2114, and a module usage table 2116. Business model information 2110 describes the business locations and the business functions performed at each business location. A business model describes the distributed requirements for a business. That is, the business model specifies the business functions that must be available and accessible at each business location. The module usage table 2116 identifies the modules and module groups that must be available at specified business locations. The business locations table 2114 stores the physical business locations where users perform business functions. A single database may service multiple business locations and a business location can use multiple databases in the preferred embodiment. This business information along with the module group and module definition information provided by module designer 630 is used to generate the distributed system information 2120. The distributed system information 2120 describes a set of databases, module groups, and modules installed in each database and how data is propagated between the databases. The distributed system information also describes how modules or module groups used at each business location map to module group installations. The distributed system information 2120 includes module or module group installation information 2122 which describes the module groups that are installed in a particular database identified in databases table 2126. Similarly the module installation table 2124 identifies the modules that are installed in a particular database in databases table 2126. The module communication table 2128 identifies the information transfer method which is to be used between any two module installations of the same module. This propagation method specifies the underlying data propagation mechanism. In the preferred embodiment, two data propagation methods provided are synchronous or asynchronous propagation. Asynchronous propagation further includes several sub-types, including n-way masters, snapshots, and read-only snapshots.

Distributed modeler 640 includes conflict handler 1920 for analyzing the potential update conflicts between modules of a particular module definition and for analyzing intra-module conflicts. In addition, conflict handler 1920 provides a means for resolving these identified update conflicts. Update conflicts occur when the replicas of a database object are updated differently in two different places before the updates are asynchronously propagated to each location. Once a module definition has been defined using module handler 1910, conflict handler 1920 is used to predict potential update conflicts if modules are used as units of distribution across a plurality of processing nodes. If an update conflict occurs, the conflict handler 1920 reports these types of conflicts through user interface 1940. Conflict handler 1920 uses information from repository 1620 for determining the interdependencies between modules formed as part of the module definition retained within module handler 1910. Conflict handler 1920 also includes conflict resolution definitions tables 1936 which store information on how to resolve potential update conflicts. Automatic update conflict resolution techniques such as using the last update date, are provided by prior art databases.

Having identified potential update conflicts, conflict handler 1920 reports these conflicts to a user through user interface 1940. The user may then modify the previously defined module definitions using module designer 630 to produce a module definition having less potential for conflicts. This iterative process may continue until an acceptable module definition is achieved. Once this module definition is determined, the module information can again be transferred to distributed modeler 1640 for a more full modeling analysis.

The concept of modules enabled by module designer 630 also supports other aspects of distributing an application program and a database. In a asynchronous data transfer configuration, separate copies of tables are at each distributed node. By defining modules using module designer 630, it becomes easy to create a list of all the database objects required by a particular node where the module is installed. In a tightly-coupled or synchronous data transfer configuration, inter-module access can be used to determine the vulnerability of an architecture to a failure at a remote site.

Network bandwidth, network reliability, and transaction volume are just a few of the areas of consideration when refining module definitions. The effects of these considerations become apparent once the module definitions are specified and the Distributed Modeler 640 is invoked. Inter-module interactions, locality of reference, knowledge of the behavior of a particular application program, and the physical components of a distributed system can also be used to refine module definitions. If a particular table is asynchronously replicated but has a high transaction volume and is updated from many places, the chances of an update conflict increase. Situations like this might suggest that the table be either synchronously replicated or that modules be merged. Again, the effects of these considerations become apparent once the module definitions are specified using the module designer 630 and the distributed modeler 640 (described below) is invoked. The module designer 630 of the present invention provides a means for viewing both inter-module and intra-module interactions. The module designer 630 and the distributed modeler 640 can be used iteratively to first define a module definition using the module designer 630 then to test the effects of the definition using the distributed modeler 640. By knowing the effects produced by a particular module definition, a new and better module definition can be generated using the module designer 630 and again tested using the distributed modeler 640.

The distributed modeler 640 includes a means for analyzing the quality of a particular distributed system in accordance with a set of impact analysis criteria as set forth below. Several metrics which highlight the impact analysis are maintained for a particular distributed system being analyzed. These metrics are grouped in four main categories: performance, conflict, availability, and transaction consistency. The details of the use of these metrics are as follows:

Performance

1. Distributed Queries and Affected Joins

This metric shows distributed queries that might take longer to execute than in a non-distributed system. Use of this metric may result in changing a replication method from a synchronous method to an asynchronous method or relocating a table to eliminate synchronous access.

2. WAN access-local/desktop

This metric weighs performance issues based on slow WAN access. This is based on a description of a network. This shows the impact of a slow WAN access on a distributed system.

3. Network Traffic-Transactions

This is information that is required to make an intelligent decision about a distributed system based upon transaction volume. If the traffic associated with replicating a table is higher than the bandwidth available, this may be able to detect architecture unlikely to succeed.

4. Network Traffic-Tables

This is very similar to the prior metric. Instead of being based upon transactions such as entering an order, this metric treats it at table level. The goal is the same. That is, looking for system architectures that won't work.

Conflicts

1. Possible Conflicts

An asynchronous configuration will not be successful without this feature. Even if the data is naturally partitioned such that there are no real conflicts, all conflicts should be flagged as potential problems. This provides information that can be used to reassign database objects to other modules, or tune a distributed system by moving modules to different nodes or changing replication methods.

2. Possible Ordering Problems

If two tables are used in the same transaction but come from different nodes or use different replication methods, there is a possibility that they may arrive at a remote node out of order. This may result in data inconsistency problems.

3. Divergence Potential

This metric is useful when dealing with conflict. Some conflict resolution methods result do not guarantee convergence of data. This metric shows the potential for divergence and gives the user the opportunity to change replication or resolution methods.

4. Intra-Module Conflicts

This metric shows a subset of all possible conflicts. The subset is conflicts that occur between installations of the same module.

5. Inter-Module Conflicts

Another subset of all possible conflicts. This shows conflicts between different modules.

Availability

1. Transaction Availability (sub-executable)

This metric shows functionality within programs that is dependent upon synchronous transactions. A program may work with without a remote node, but some of the functionality in the program may be affected by a remote node being unavailable.

2. Transaction Availability (executable)

This metric shows programs that are dependent upon synchronous transactions. This is a superset of the sub-executable availability.

3. Module Availability

This metric shows modules that are dependent upon synchronous transactions. This is a superset of the executable availability.

4. Node Dependency

This metric shows an even higher level availability pertaining to nodes.

Transaction Consistency

This metric highlights Illegal/Invalid configurations.

1. Effect of Mixed methods

This metric detects configurations that won't work or cause inconsistent results.

2. Foreign Key Constraints

This metric detects configurations where foreign key constraints may fail.

Referring now to FIGS. 22 through 25, examples illustrate the operation of the distributed modeler 640 and the distributed system information resident therein. Referring to FIG. 22, a sample business entity is shown as comprising a headquarters facility HQ at which four modules must be accessible. These modules are Orders, Shipping, Customers, and Receivables. Three other sales sites are shown as part of the sample business entity illustrated in FIG. 22. Sales site 1 must have access to the Orders module and the Customers module. Similarly sales sites 2 and 3 must also have access to Orders and Customers modules.

Referring now to FIG. 23, the business location table, the module usage table, and two sample distributed systems for the sample illustrated in FIG. 22 are shown. The business model data access requirements illustrated in FIG. 22 are satisfied by each of the two sample architectures listed in the table in FIG. 23. For example, the table of FIG. 23 at the fifth line indicates that the sales site 1 must have access to the Orders module. This business requirement is satisfied in the first sample architecture by modeling the installation of the Orders module in the headquarters database (HQ) at the headquarters site. As a second alternative distributed system, the sales site I requirement for the usage of orders data is satisfied in the second sample architecture by modeling the installation of the Orders module at the sales site 1 database. Each of the other installations required for implementing either of the two sample architectures are listed in the table of FIG. 23. Note that each of the two sample architectures shown in FIG. 23 satisfy the business model / business requirements. In the first sample architecture, users of sales site 1, 2, or 3 all connect to HQ database to access data. In the second sample architecture, users of sales site 3 connect to sales site 1 to access the orders and customer data.

Referring now to FIG. 24, another example illustrates a business model having a headquarters location and two sales sites, sales site 1 and sales site 2. This example illustrates the usage of module communications information to define the method of distributed transfer between nodes in a distributed system. In the example of FIG. 24, a database HQDB is installed at the headquarters node. This database has the following modules installed: Orders, Shipping, Customers, and Receivables. The sales site 1 and sales site 2 nodes in the example of FIG. 24 specify that sales site 1 and sales site 2 must have access to Orders and Customers modules. A database DB1 is installed at sales site 1 and a database DB2 is installed at sales site 2. Lines connecting the headquarters node and sales site 1 and sales site 2 indicate the mode of distributed transfer between the nodes. For example, database information is transferred from headquarters to sales site 1 using a synchronous transfer method. In contrast, database information is transferred from sales site 1 and sales site 2 back to the headquarters node in an asynchronous distributed transfer methodology.

Referring now to FIG. 25, the content of tables in the distributed system information 2120 of the distributed modeler 640 is illustrated. For example, the headquarters database HQDB is shown as having the Orders, Shipping, Customers, and Receivables modules installed therein. It is further specified in the module communications table that the transfer of orders from the HQDB to the sales site 1 DB1 is performed using a synchronous distributed transfer methodology. Similarly, orders transferred from HQBD to sales site 2 DB2 is performed using an asynchronous distributed transfer methodology. Similarly, data transfers between the other nodes in each direction are specified in the tables illustrated in FIG. 25.

The distributed modeler 640 provides a distributed module architecture table set for use by the distributed installer 650. The distributed installer actually deploys the modules defined in the module designer 630 and modeled using the distributed modeler 640. A user can deploy one of many distributed systems as defined by the information in the distributed system information set 2120. By appropriately defining modules using the module designer 630, and by appropriately choosing a distributed transfer methodology between modules using the distributed modeler 640, the distributed installer 650 is able to transfer the database information to the appropriate node and install the specified modules within the databases at the specified locations. In this manner, a user can efficiently develop and deploy a database architecture in conformance with a predefined set of business requirements.

Figure 26:
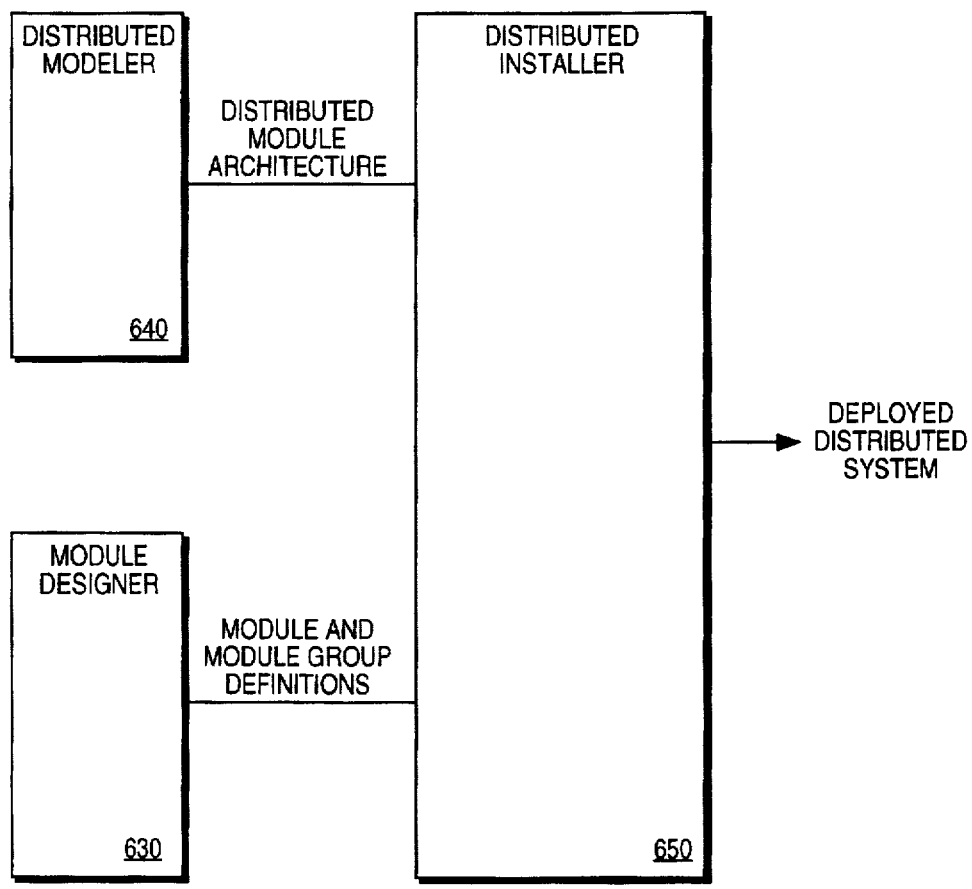
FIG. 26 illustrates the architecture of the distributed installer.

The distributed installer 650 reads distributed tables directly from the distributed modeler 640 and the module designer 630 as shown in FIG. 26. These tables identify the modules defined and the locations at which the modules should be installed. The distributed installer 650 automates the generation of commands for deploying the modules without the need for manually entering the commands.

Thus, a distributed system modeler for modeling a distributed system architecture is disclosed. These specific arrangements and methods described herein are merely illustrative of the principles of this invention. Numerous modifications in form and detail may be made by those of ordinary skill in the art without departing from the scope of the present invention. Although this invention has been shown in relation to a particular preferred embodiment, it should not be considered so limited. Rather, the present invention is limited only by the scope of the appended claims.

What is claimed is:

1. A distributed system modeler comprising:
   means for receiving interdependency information specifying interdependencies between a plurality of data objects and programs;
   means for satisfying a pre-determined set of criteria by defining a plurality of modules based upon said interdependency information wherein each module of said plurality of modules represents a different grouping of a portion of said plurality of data objects and programs;
   means for specifying a distributed system by assigning said plurality of modules to nodes in said distributed system; and
   means for assigning a distributed transfer methodology between modules in said distributed system.

2. The distributed system modeler as claimed in claim 1 further including:
   means for generating impact analysis criteria defining a quality of said distributed system.

3. The distributed system modeler as claimed in claim 2 wherein said impact analysis criteria further including performance metrics.

4. The distributed system modeler as claimed in claim 2 wherein said impact analysis criteria further including conflict metrics.

5. The distributed system modeler as claimed in claim 2 wherein said impact analysis criteria further including data object or program availability metrics.

6. The distributed system modeler as claimed in claim 2 wherein said impact analysis criteria further including transaction consistency metrics.

7. The distributed system modeler as claimed in claim 1 wherein said distributed transfer methodology is a distributed transaction methodology.

8. The distributed system modeler as claimed in claim 7 wherein said distributed transaction methodology further includes a remote procedure call.

9. The distributed system modeler as claimed in claim 1 wherein said distributed transfer methodology is a synchronous replication methodology.

10. The distributed system modeler as claimed in claim 8 wherein said synchronous replication methodology further includes a remote procedure call.

11. The distributed system modeler as claimed in claim 1 wherein said distributed transfer methodology is an asynchronous replication methodology.

12. The distributed system modeler as claimed in claim 11 wherein said asynchronous replication methodology further includes a remote procedure call.

13. The distributed system modeler as claimed in claim 1 wherein said distributed transfer methodology is a procedural replication methodology.

14. A distributed system modeler comprising:
- a repository containing interdependency information specifying interdependencies between a plurality of data objects and programs;
- a module designer, coupled to said repository, for defining a plurality of modules based upon said interdependency information, wherein each module of said plurality of modules represents a different grouping of a portion of said plurality of data objects and programs; and
- a distributed modeler for assigning modules to nodes in a distributed system and for assigning a distributed transfer methodology between modules in said distributed system.

15. The distributed system modeler as claimed in claim 14 wherein said repository is a source code repository.

16. The distributed system modeler as claimed in claim 14 wherein said distributed modeler further including:
- logic for generating impact analysis criteria defining a quality of said distributed system.

17. The distributed system modeler as claimed in claim 16 wherein said impact analysis criteria including performance metrics.

18. The distributed system modeler as claimed in claim 16 wherein said impact analysis criteria further including conflict metrics.

19. The distributed system modeler as claimed in claim 16 wherein said impact analysis criteria further including data object or program availability metrics.

20. The distributed system modeler as claimed in claim 14 further including:
- a distributed installer for deploying modules on said nodes in a configuration corresponding to an assignment of modules and distributed transfer methodologies generated by said distributed modeler.

21. A method for modeling a distributed system, the method comprising the steps of:
- receiving interdependency information specifying interdependencies between a plurality of data objects and programs;
- grouping portions of said plurality of data objects and programs into a plurality of modules based upon said interdependency information to satisfy a predetermined set of criteria;
- specifying a distributed system by assigning said plurality of modules to nodes in said distributed system; and
- determining and assigning appropriate distributed transfer methodologies between said plurality of modules in said distributed system.

22. The method as claimed in claim 21 further including the step of:
- generating impact analysis criteria defining a quality of said distributed system.

23. The method as claimed in claim 22 wherein said impact analysis criteria further includes performance metrics.

24. The method as claimed in claim 22 wherein said impact analysis criteria further includes conflict metrics.

25. The method as claimed in claim 22 wherein said impact analysis criteria further includes data object or program availability metrics.

26. The method as claimed in claim 22 wherein said impact analysis criteria further includes transaction consistency metrics.

27. The method as claimed in claim 21 wherein said distributed transfer methodology is a distributed transaction methodology.

28. The method as claimed in claim 27 wherein said distributed transaction methodology further includes a remote procedure call.

29. The method as claimed in claim 21 wherein said distributed transfer methodology is a synchronous replication methodology.

30. The method as claimed in claim 29 wherein said synchronous replication methodology further includes a remote procedure call.

31. The method as claimed in claim 21 wherein said distributed transfer methodology is an asynchronous replication methodology.

32. The method as claimed in claim 31 wherein said asynchronous replication methodology further includes a remote procedure call.

33. The method as claimed in claim 21 wherein said distributed transfer methodology is a procedural replication methodology.

34. An article of manufacture comprising a computer usable mass storage medium having computer readable program code embodied therein for causing a processor to model a distributed system, said computer readable program code in said article of manufacture comprising:
- means for receiving interdependency information specifying interdependencies between a plurality of data objects and programs;
- means for defining a plurality of modules to satisfy a pre-determined set of criteria, wherein each module of said plurality of modules represents a different grouping of an interdependent portion of said plurality of data objects and programs;
- means for specifying a distributed system and assigning modules to nodes in said distributed system; and
- means for assigning a distributed transfer methodology between modules in said distributed system.

35. The article of manufacture as claimed in claim 34 wherein said computer readable program code in said article of manufacture further including:
- means for generating impact analysis criteria defining a quality of said distributed system.

36. The article of manufacture as claimed in claim 35 wherein said impact analysis criteria further including performance metrics.

37. The article of manufacture as claimed in claim 35 wherein said impact analysis criteria farther including conflict metrics.

38. The article of manufacture as claimed in claim 35 wherein said impact analysis criteria further including data object or program availability metrics.

39. The article of manufacture as claimed in claim 35 wherein said impact analysis criteria further including transaction consistency metrics.

40. The article of manufacture as claimed in claim 34 wherein said distributed transfer methodology is a distributed transaction methodology.

41. The article of manufacture as claimed in claim 40 wherein said distributed transaction methodology further includes a remote procedure call.

42. The article of manufacture as claimed in claim 34 wherein said distributed transfer methodology is a synchronous replication methodology.

43. The article of manufacture as claimed in claim 42 wherein said synchronous replication methodology further includes a remote procedure call.

44. The article of manufacture as claimed in claim 34 wherein said distributed transfer methodology is an asynchronous replication methodology.

45. The article of manufacture as claimed in claim 44 wherein said asynchronous replication methodology further includes a remote procedure call.

46. The article of manufacture as claimed in claim 34 wherein said distributed transfer methodology is a procedural replication methodology.

* * * * *